(12) United States Patent
Artzi et al.

(10) Patent No.: US 7,779,118 B1
(45) Date of Patent: Aug. 17, 2010

(54) METHOD AND APPARATUS FOR REPRESENTING, MANAGING, ANALYZING AND PROBLEM REPORTING IN STORAGE NETWORKS

(75) Inventors: Amanuel Ronen Artzi, Framingham, MA (US); Viren Pherwani, Shrewsbury, MA (US); Ron Even, Fairfield, CT (US); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 684 days.

(21) Appl. No.: 11/646,638

(22) Filed: Dec. 28, 2006

(51) Int. Cl.
  *G06F 15/173* (2006.01)
(52) U.S. Cl. .................. 709/224; 709/223; 709/226
(58) Field of Classification Search .......... 709/223–226
  See application file for complete search history.

(56) References Cited

U.S. PATENT DOCUMENTS

| | | | |
|---|---|---|---|
| 7,103,652 B1 * | 9/2006 | Dobberpuhl et al. | 709/223 |
| 7,362,974 B2 * | 4/2008 | De Patre et al. | 398/50 |
| 7,516,214 B2 * | 4/2009 | Gandhi | 709/224 |
| 2003/0149761 A1 * | 8/2003 | Baldwin et al. | 709/224 |
| 2004/0243699 A1 * | 12/2004 | Koclanes et al. | 709/224 |
| 2006/0253561 A1 * | 11/2006 | Holmeide et al. | 709/223 |
| 2007/0022192 A1 * | 1/2007 | Nguyen et al. | 709/224 |
| 2007/0180085 A1 * | 8/2007 | Barnett et al. | 709/223 |
| 2008/0288636 A1 * | 11/2008 | Moriwaki | 709/224 |

* cited by examiner

*Primary Examiner*—Duyen M Doan
*Assistant Examiner*—Brian P Whipple
(74) *Attorney, Agent, or Firm*—Krishnendu Gupta; Joseph D'Angelo

(57) ABSTRACT

A method, apparatus and computer program product for performing an analysis on a Storage Area Network (SAN) system, containing a plurality of components, is disclosed. The method comprises the steps of representing selected ones of the plurality of components and the relationship among the components, wherein the representation comprises the steps of creating at least one non-specific representation of the selected components and creating at least one non-specification representation of relations along which the events propagate amongst the selected components, providing a mapping between a plurality events and a plurality of observable events occurring among the components, wherein the mapping is represented as a value associating each event with each observable event, and performing the system analysis based on the mapping of events and observable events.

14 Claims, 26 Drawing Sheets

FIG. 7

| CLASS | DIAGNOSIS | EXPLANATION |
|---|---|---|
| SWITCH | DOWN | THE SAN SWITCH IS NOT FUNCTIONING PROPERLY AND CANNOT BE REACHED |
| ARRAY | DOWN | THE ARRAY IS NOT FUNCTIONING PROPERLY AND NONE OF ITS DISKS CAN BE REACHED |
| STORAGE DISK | DOWN | THE DISK IS NOT FUNCTIONING PROPERLY AND THE DATA IT STORES CANNOT BE ACCESSED |
| HBA | DOWN | THE HOST BUS ADAPTER IS NOT FUNCTIONING PROPERLY |
| FILE SERVER | DOWN | THE FILE SERVER IS NOT FUNCTIONING PROPERLY |
| HOST | DOWN | THE HOST IS NOT FUNCTIONING PROPERLY |
| REDUNDANCY GROUP | AT RISK | THE NUMBER OF SWITCHES THAT ARE DOWN IN THIS GROUP HAS EXCEEDED THE USER DEFINED THRESHOLD |
| REDUNDANCY GROUP | DOWN | ALL THE SWITCHES IN THIS GROUP ARE DOWN |

| DATA PATH | DOWN | THE DATA PATH IS DOWN |
|---|---|---|
| DATA PATH REDUNDANCY GROUP | AT RISK | THE NUMBER OF DATA PATHS THAT ARE DOWN IN THIS GROUP HAS EXCEEDED THE USER DEFINED THRESHOLD |
| DATA PATH REDUNDANCY GROUP | DOWN | ALL DATA PATHS IN THIS GROUP ARE DOWN |

FIG. 10

| PROBLEM \ SYMPTOMS | SYMMETRIX FRONT END DIRECTOR OPERATIONALLY DOWN | CLARIION STORAGE PROCESSOR OPERATIONALLY DOWN | CLARIION STORAGE PROCESSOR UNREACHABLE | SWITCH UNREACHABLE | SYMMETRIX LOGICAL DEVICE NOT READY | CLARIION DISK OPERATIONALLY DOWN | CELERRA DATAMOVER OPERATIONALLY DOWN | ALL PEER SWITCH PORT OPERATIONALLY DOWN |
|---|---|---|---|---|---|---|---|---|
| SYMMETRIX FRONT END DIRECTOR DOWN | 1 | | | | | | | |
| SYMMETRIX FRONT END PORT DOWN | | | | | | | | 1 |
| CLARIION FRONT END PORT DOWN | | | | | | | | 1 |
| HOST BUS ADAPTOR DOWN | | | | | | | | 1 |
| CLARIION STORAGE PROCESSOR DOWN | | 1 | | | | | | |
| SYMMETRIX LOGICAL DEVICE DOWN | | | | | 1 | | | |
| CLARIION DISK DOWN | | | | | | 1 | | |
| CELERRA DATAMOVER DOWN | | | | | | | 1 | |
| SWITCH DOWN | | | | 1 | | | | |
| SYMMETRIX DOWN | | | | | | | | 1 |
| CLARIION DOWN | | | 1 | | | | | 1 |
| PORTLINK DOWN | | | | | | | | 1 |

FIG. 11

| PROBLEM \ IMPACT | HOST FILE SYSTEM ACCESS IMPACTED | HOST ACCESS IMPACTED | HOST PHYSICAL DEVICE ACCESS IMPACTED | DATAPATH REDUNDANCY GROUP ALL COMPONENTS DOWN | DATAPATH REDUNDANCY GROUP AT RISK | HARDWARE PORT OPERATIONALLY DOWN | HARDWARE PORT ADMIN DOWN | FABRIC MEMBERSHIP CHANGED | VIRTUAL SWITCH OPERATIONALLY DOWN | STORAGE PROCESSOR OPERATIONALLY | SYMM FRONT END DIRECTOR OPERATIONALLY DOWN |
|---|---|---|---|---|---|---|---|---|---|---|---|
| SYMMETRIX FRONT END DIRECTOR DOWN | 1 | 1 | 1 |   | 1 |   |   |   |   |   | 1 |
| * SYMMETRIX FRONT END PORT DOWN | 1 | 1 | 1 |   | 1 | 1 |   |   |   |   |   |
| CLARION FRONT END PORT DOWN | 1 | 1 | 1 |   | 1 | 1 |   |   |   |   |   |
| * HOST BUS ADAPTER DOWN | 1 | 1 | 1 |   | 1 | 1 |   |   |   |   |   |
| CLARION STORAGE PROCESSOR DOWN | 1 | 1 | 1 | 1 | 1 | 1 |   |   |   | 1 |   |
| SWITCH DOWN | 1 | 1 | 1 | 1 | 1 | 1 |   | 1 | 1 |   |   |
| SYMMETRIX DOWN | 1 | 1 | 1 | 1 | 1 | 1 |   |   |   |   | 1 |
| CLARION DOWN | 1 | 1 | 1 | 1 | 1 | 1 |   |   |   | 1 |   |
| PORTLINK DOWN | 1 | 1 | 1 |   | 1 | 1 | 1 | 1 |   |   |   |

| PROBLEM \ IMPACT | NAS FILESYSTEM ACCESS IMPACTED | FILESERVER OPERATIONALLY DOWN | CLIENT HOST ACCESS IMPACTED | DATAPATH REDUNDANCY GROUP ALL COMPONENTS DOWN | DATAPATH REDUNDANCY GROUP AT RISK | CLARION LUN DOWN | SYMM LOGICAL DEVICE DOWN |
|---|---|---|---|---|---|---|---|
| SYMMETRIX LOGICAL DEVICE DOWN |   |   |   |   | 1 |   | 1 |
| CLARION DISK DOWN |   |   |   | 1 | 1 | 1 |   |
| * CELERRA DATAMOVER DOWN | 1 | 1 | 1 |   |   |   |   |

METHOD AND APPARATUS FOR REPRESENTING, MANAGING, ANALYZING AND PROBLEM REPORTING IN STORAGE NETWORKS

RELATED APPLICATION

This application is related to co-pending U.S. patent application Ser. No. 11/176,982, entitled "Method and Apparatus for Analyzing and Problem Reporting in Storage Area Networks" filed Mar. 31, 2004, the contents of which are incorporated by reference herein.

FIELD OF THE INVENTION

The invention relates generally to computer networks, and more specifically to apparatus and methods for modeling and analyzing Storage Area Networks.

BACKGROUND OF THE INVENTION

Storage Area Networks (SANs) have considerably increased the ability of servers to add large amounts of storage capability without incurring significant expense or service disruption for re-configuration. However, the ability to analyze SAN performance and/or availability has been limited by the models that have been employed. The lack of a systematic model of behavior specifically suited for the SAN objects and relationships limits several forms of important analysis. For example, it is difficult to determine the impact in the SAN, in the overall system and/or on the applications. Another example is determining the root cause of problems that are detected as symptoms in SAN, in the overall system and/or on the applications.

As with all modeling methods, the ability to use a model to determine the performance of a system is dependent upon the level to which the model represents the system. When only a limited number of network elements and/or relationships are represented in the model, the results produced by the model may not accurately correspond to the results produced by the system. The commonly-owned related U.S. patent application Ser. No. 11/176,982 provides a first method for presenting a systematic model suited for the SAN objects and relationships. However, model representation is limited to basic elements and configurations and lacks information regarding finer details of the system operation. Hence, to provide more accurate representation of the SAN, there is a need in the industry for an improved model of Storage Area Networks suitable for performing an analysis and more accurately determining causes of failures and the impacts of such failures.

SUMMARY OF THE INVENTION

A method, apparatus and computer program product for performing an analysis on a Storage Area Network (SAN) system, containing a plurality of components, is disclosed. The method comprises the steps representing selected ones of the plurality of components and the relationship among the components, wherein the representation comprises the steps of creating at least one non-specific representation of the selected components and creating at least one non-specific representation of relations along which the events propagate amongst the selected components, providing a mapping between a plurality events and a plurality of observable events occurring among the components, wherein the mapping is represented as a value associating each event with each observable event, and performing the system analysis based on the mapping of events and observable events.

DETAILED DESCRIPTION OF THE FIGURES

FIG. 7 illustrates an exemplary SAN diagnostic analysis in accordance with the principles of the invention;

FIG. 10 illustrate an exemplary root-cause analysis causality matrix in accordance with the principles of the invention;

FIG. 11 illustrate an exemplary impact analysis causality matrix in accordance with the principles of the invention.

Figure 1:
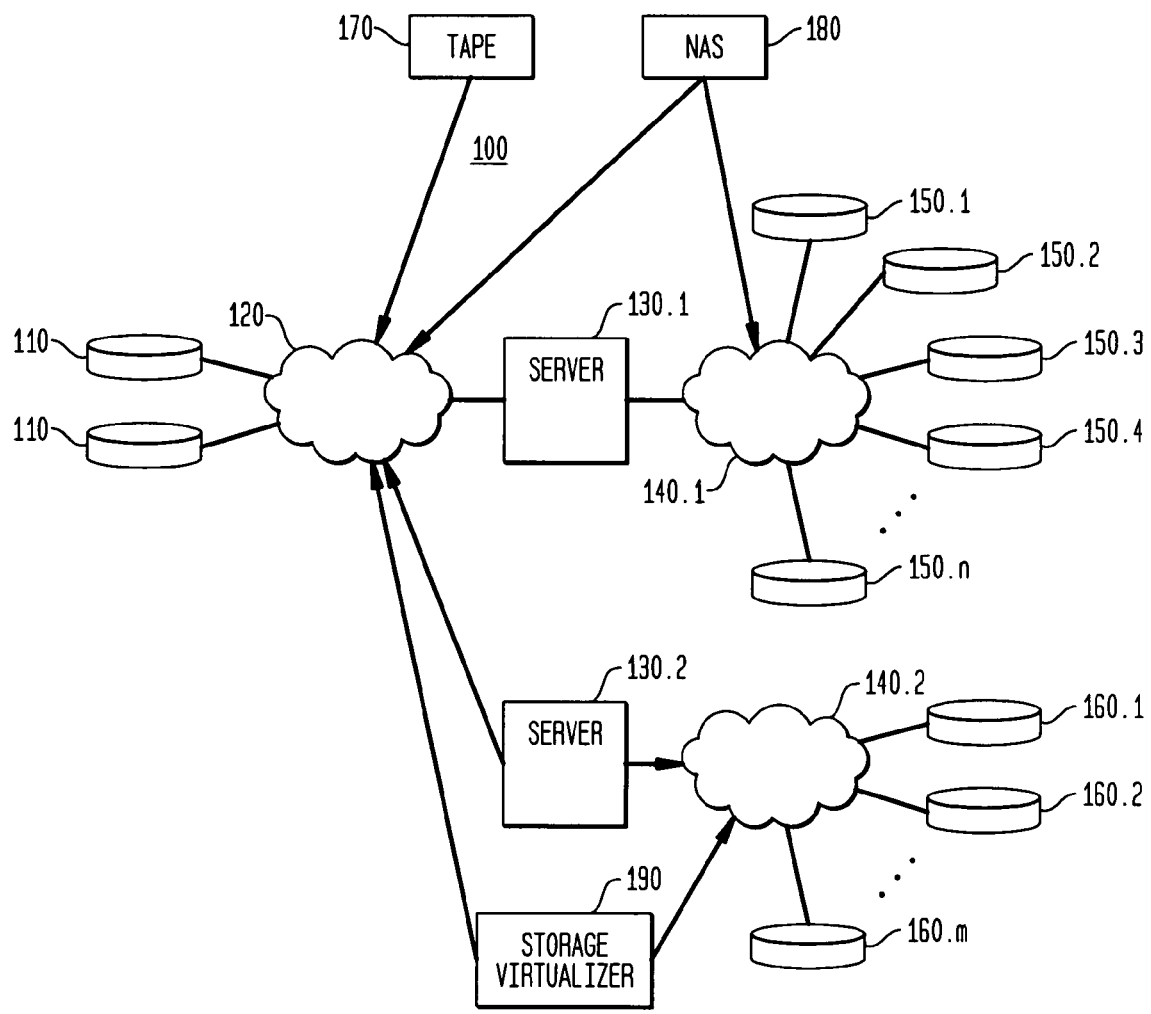
FIG. 1 illustrates a conventional Storage Area Network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates an exemplary embodiment of a Storage Area Network (SAN) 100, wherein computing systems 110 may provide or receive information from server 130 through a communication path represented as network 120. Servers 130.1, 130.2 are further in communication, via network 140.1, 140.2, respectively, with a plurality of storage medium 150.1-150.*n*, and 160.1-160.*m*. Storage medium 150.1-150.*n* and 160.1-160.*m* represent storage volumes associated with the respective Storage Area Network (SAN) 140.1, 140.2. The use of a SAN is advantageous in that additional storage capacity may be added by adding additional storage medium to the network. In this illustrated case, network 120 may represent a network such as the Internet, which uses an IP-based protocol and network 140.1 may represent a network using a Fibre Channel (FC) based protocol. Fibre Channel-based protocols have been developed for SANs as they provide a high speed access and large bandwidths. Recently, IP-based networks have been used to support server 130.1-storage medium 150.1-150.*n* communications. SANs, Fibre Channel-protocols and IP-protocols are well known in the art and need not be discussed further herein.

Also illustrated are Tape 170 and NAS 180. Tape 170 represents tape systems that may be accessed via network 120 to store information received from computer systems 110 or provide stored information to computer systems 110. Tape 170 is a well-known method of sequentially storing and retrieving information and need not be discussed in detail herein. NAS 180 (Network Attached Systems) represents file servers that are specifically designed to provide an easy means of adding additional storage capability to a network. NAS 180 may receive and provide information directly from computer system 110, via network 120, or may be attached to a SAN, for example SAN 140.1, as illustrated, to send/receive information from computer users 110. Storage virtualizaer 190 represents a logical representation of the network shown in FIG. 1. That is, storage virtualizaer represents a means for presenting storage network to users 110 without including all the details contained within the storage device, whether the devices are a tape, a NAS or a SAN.

Figure 2:
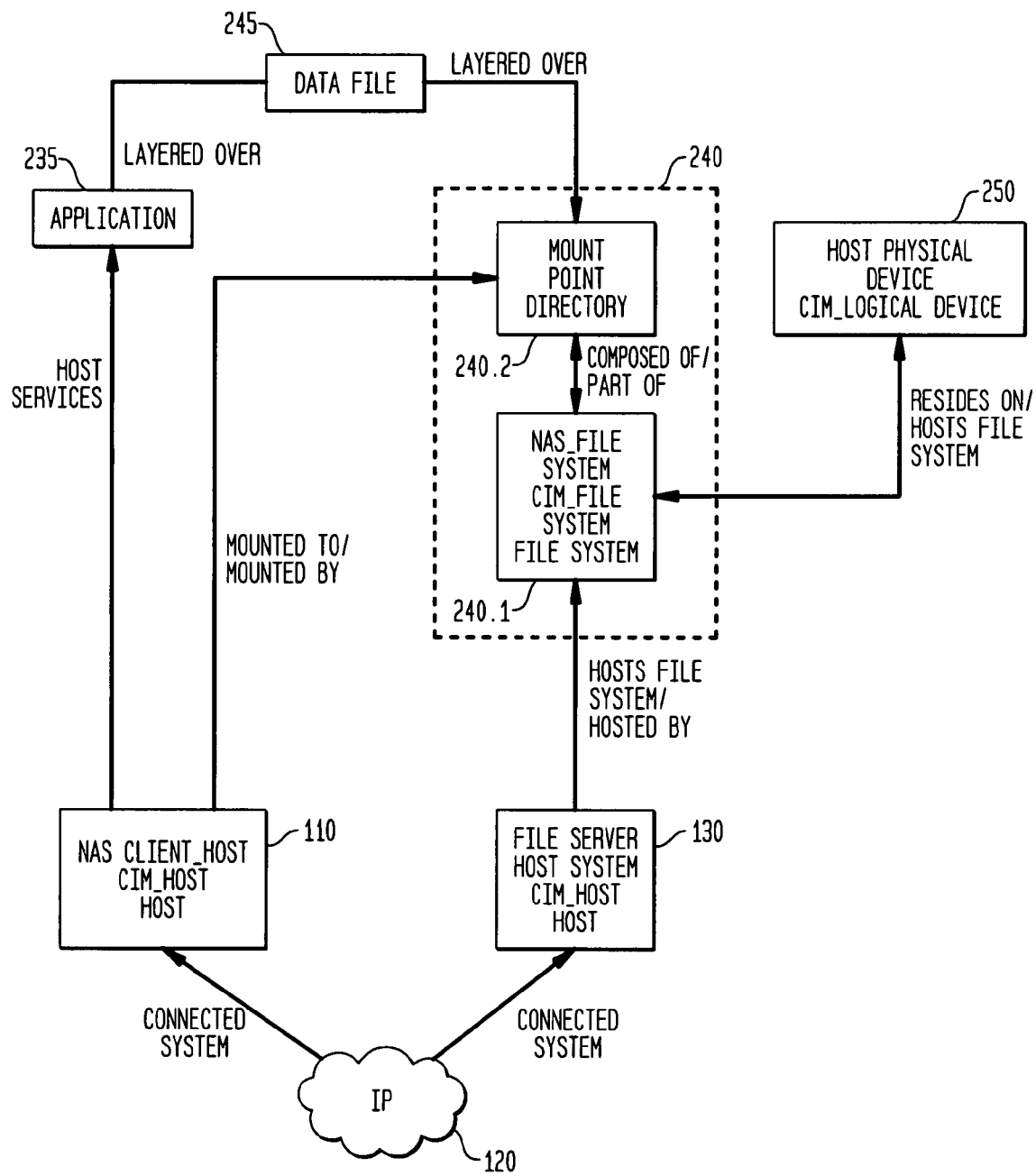
FIG. 2 illustrates a logical representation of the exemplary IP network shown in FIG. 1.

FIG. 2 illustrates a logical representation of the IP network shown in FIG. 1. In this case, network 120 enables communication between host or computer system 110 and file server 130 (see FIG. 1). In this illustrated case, the host 110 represents a NAS client host, which represents a device upon which NAS addressing components are hosted. Typically, the host includes software that allows a simple interface between the network and associated storage devices. Also illustrated is application 235, which is "hosted" on computer system 110 and file system 240 "hosted" on file server 130. Application 235 and file system 240 represent programs that are independently executed on their respective host devices. As would be appreciated, application 235 and file system 240 may be hosted on the same or different hosts (i.e., servers). Data file 245 represents the relationship between the application 235 and file system 240.

File system 240 is composed of a NAS file system 240.1 and a mount point directory 240.2. The NAS file system 240.1 represents a sharable logical construct, which is based on the storage accessible to the NAS device. The Mount Point Directory 240.2 represents the access path for client hosts to use the NAS filesystem.

Figure 3A:
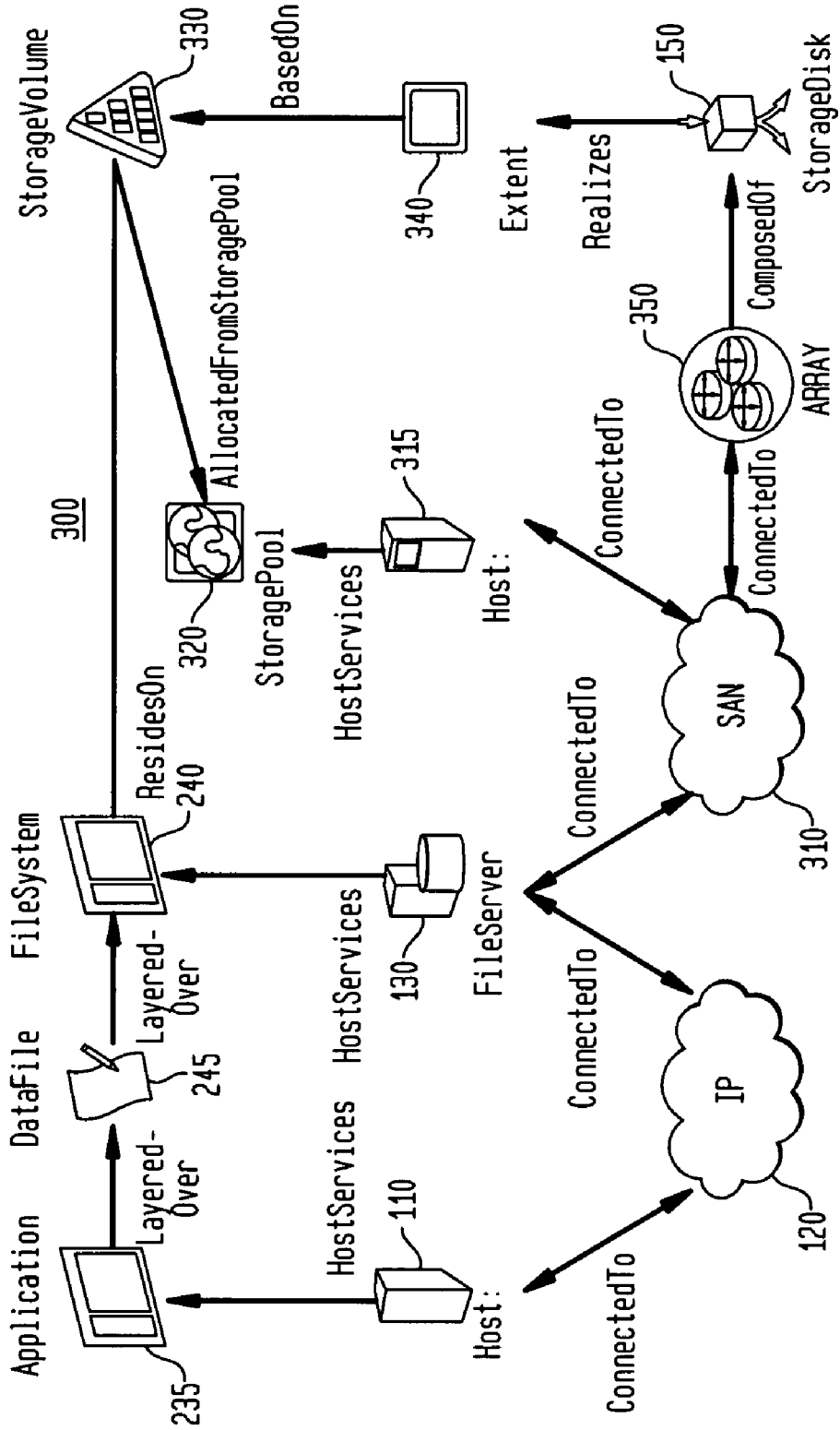
FIGS. 3A-3B illustrate a logical representation of an exemplary SAN.

FIG. 3A illustrates a logical representation of an exemplary SAN domain and related IP and application domains. In this illustrated example, the elements of the IP network, i.e., computing system 110, network 120, file server 130 and respective software 235, 240 are as shown in FIG. 2A, are further in communication, via SAN 310, with a host system 315 and a storage array 350, which logically represents disks 150.1-150.n (see FIG. 1). Host 315 represents the manager for the storage pool and executes software 320 for the storage pool management. The storage disks 150 are divided in logical elements referred to as Extents 340, which are further allocated to another logical entity, i.e., storage volumes 330. The allocation of extents 340 to storage volumes 330 is carried on by the storage pool manager (not shown).

Extents 340, more specifically, are units of allocation of disks, memory etc., and represent a generalization of the traditional storage block concept. A volume is composed of extents 340 and is used to create a virtual space for the file system. For example, references to drives C:, D:, E:, etc. may be associated with logical volume labels within, for example, the MICROSOFT WINDOWS operating system. MicroSoft and Windows are registered trademarks of Microsoft Corporation, Redmond, Wa., USA.

The storage pool 320 is representative of a plurality of extents 340 and used for administrative and abstraction purposes. In this case, when allocation of a volume is desired, the storage pool manager selects a plurality of extents 340 and designates selected extents 340 as a volume 330. Thus, the file system 240 (FIG. 2) is able to allocate storage volumes to store its files. Storage volume 330 and extent 340, which are well-known concepts associated with the logical representation of physical storage devices.

Figure 3B:
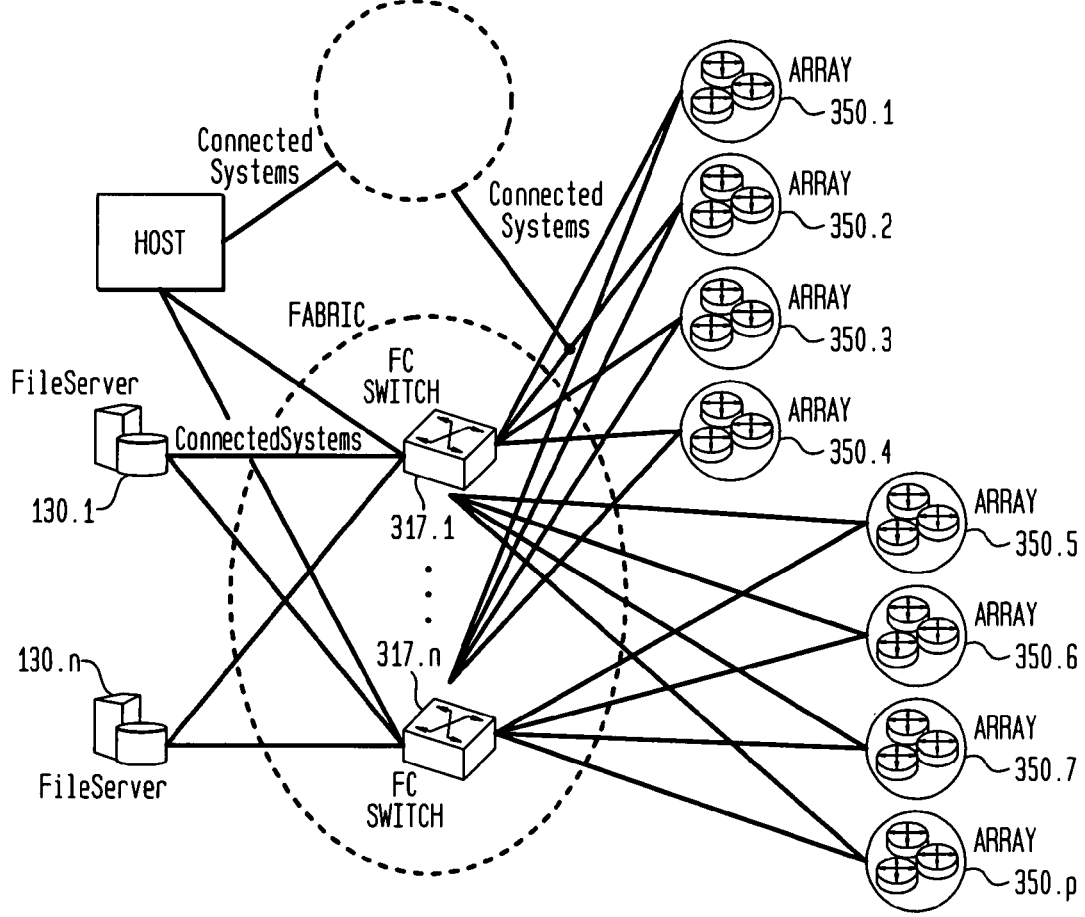

FIG. 3B illustrates an exemplary SAN deployment, wherein file servers 130.1-130.n are each in communication with a plurality of router switches 317.1-317.m. Each of the router switches 317.1-317.m further are in communication with storage medium arrays 350.1-350.p. In this exemplary SAN deployment, the users, through the file server 130.1, for example, may access or receive information from any of the arrays 350.1-350.p. Similarly, data from one array may be duplicated or backed-up on at least one of the arrays 350.1-350.p.

Figure 4A:
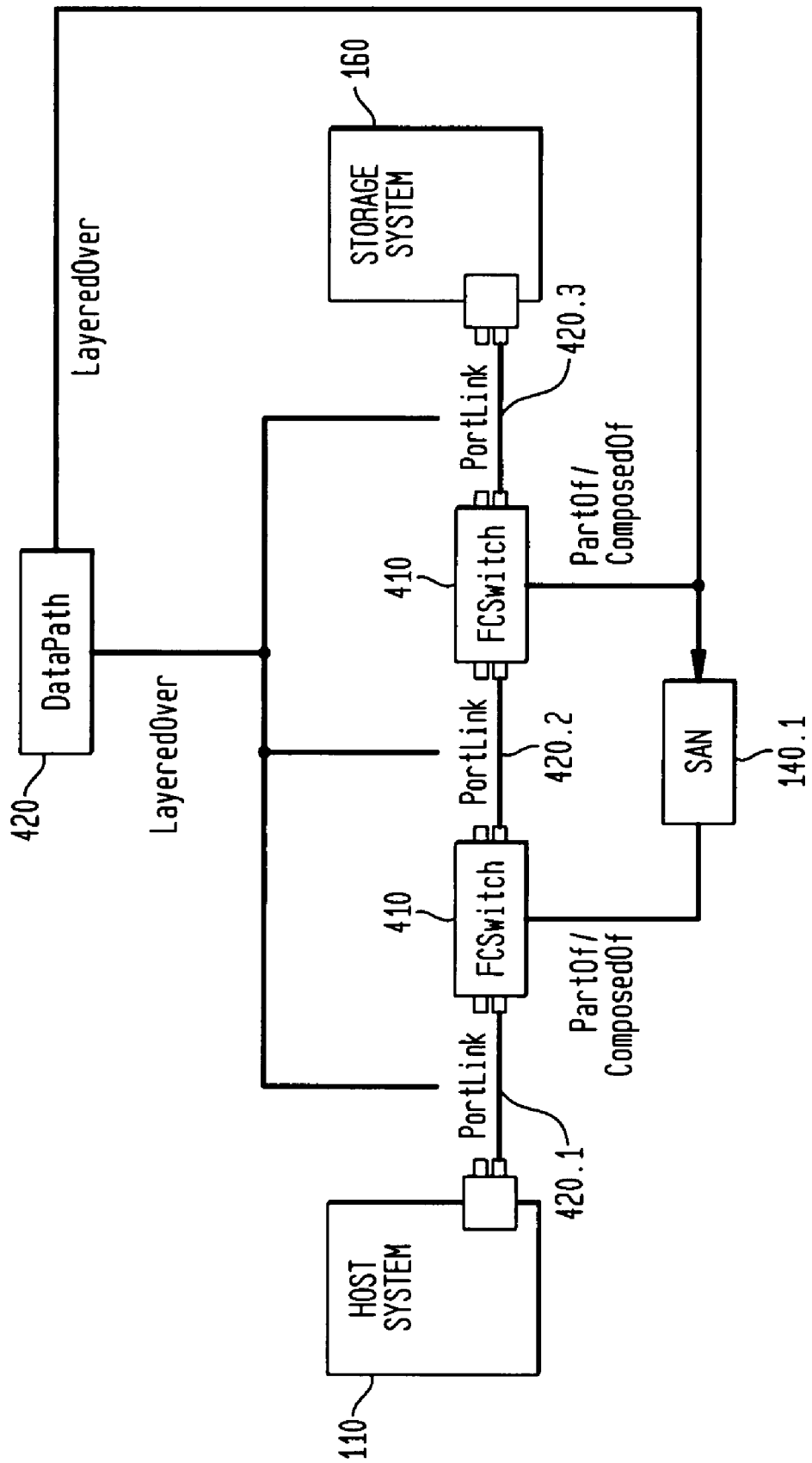
FIGS. 4A-4B illustrate an exemplary logical representation of communication links among components of a SAN.

FIG. 4A illustrates an exemplary logical representation of the communication links among the components of a SAN. That is, the host system 110 is in communication with a switch 410, in this example an FC switch, through at least one port via a port link 420.1. The switches 410 are further in communication with each other via at least one second port link 420.2 and the last switch is in communication with the storage system 160 via port link 420.3. Although only two switches are shown it would be recognized that a plurality of switches may be included within conventional NAS or SAN environments. A data path object 420 is used to logically represent the attributes and parameters of the port links from the host 110 to the storage system 160. Although Fibre channel switches are shown it would be recognized that same concepts apply to SAN deployed over IP network.

Figure 4B:
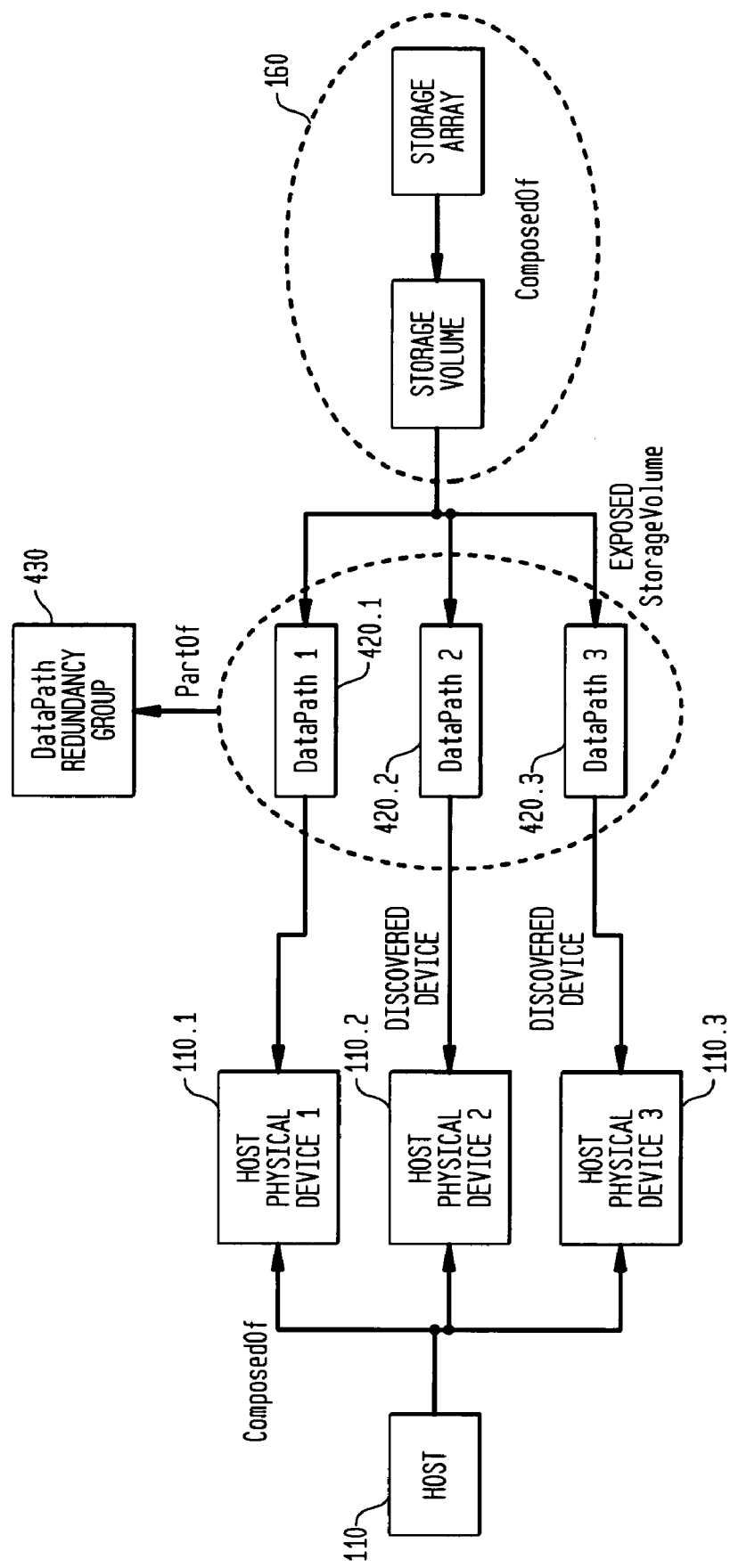

FIG. 4B illustrates an exemplary logical representation of multiple data paths used to communicate with a storage system 160 and specifically with a single Storage volume. In this illustrated case, host 110 represents a plurality of host devices 110.1-110.3, which utilize a corresponding data path 420.1-420.3. The plurality of data paths are logically represented as data path redundancy group 430 (DPRG). DPRG represents the general attributes and properties of the associated data paths.

Figure 5:
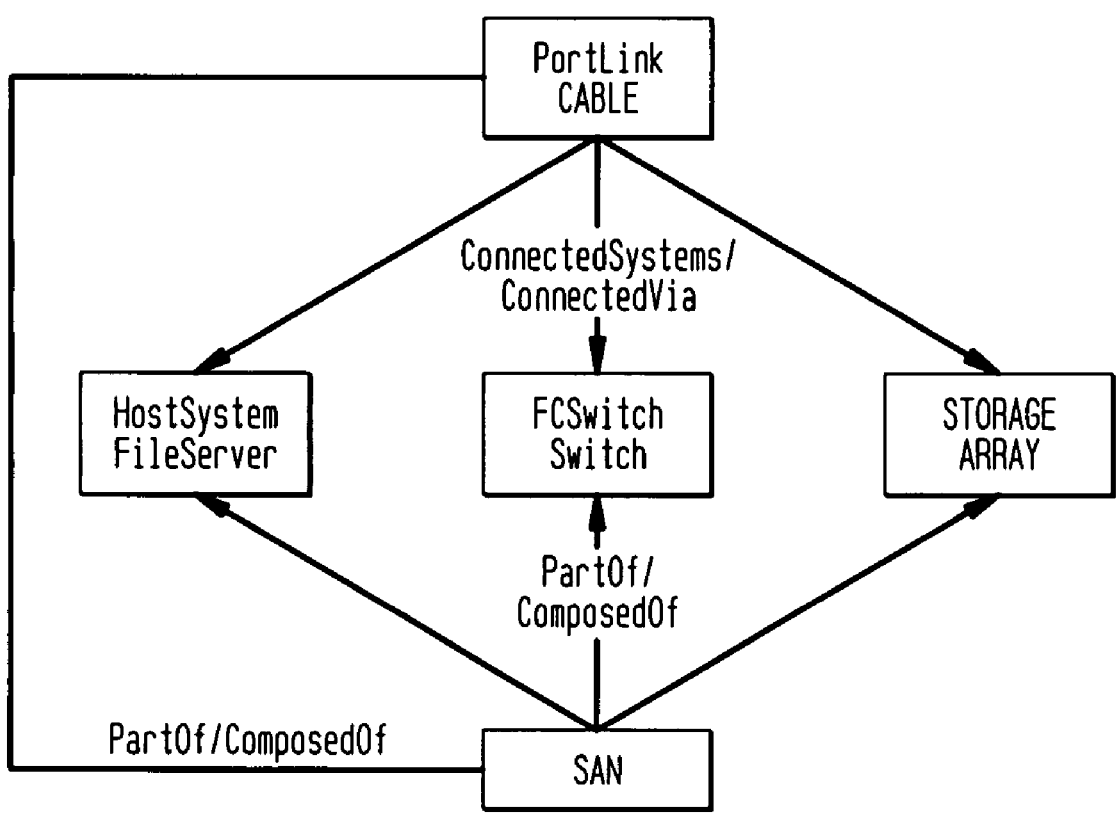
FIG. 5 illustrates an exemplary logical representation of a port link and its relationship to the elements shown in FIG. 4A in accordance with the principles of the invention.

FIG. 5 illustrates a logical representation of port link and its relationship to the elements, as shown in FIG. 4A. That is, the port link object, which is part of the SAN, is related to each of the host systems, FCswitch and storage array objects as being connected-to the aforementioned objects. Each of the host systems, FCswitch and storage array objects are related to the SAN object as being part of the SAN object.

Figure 6:
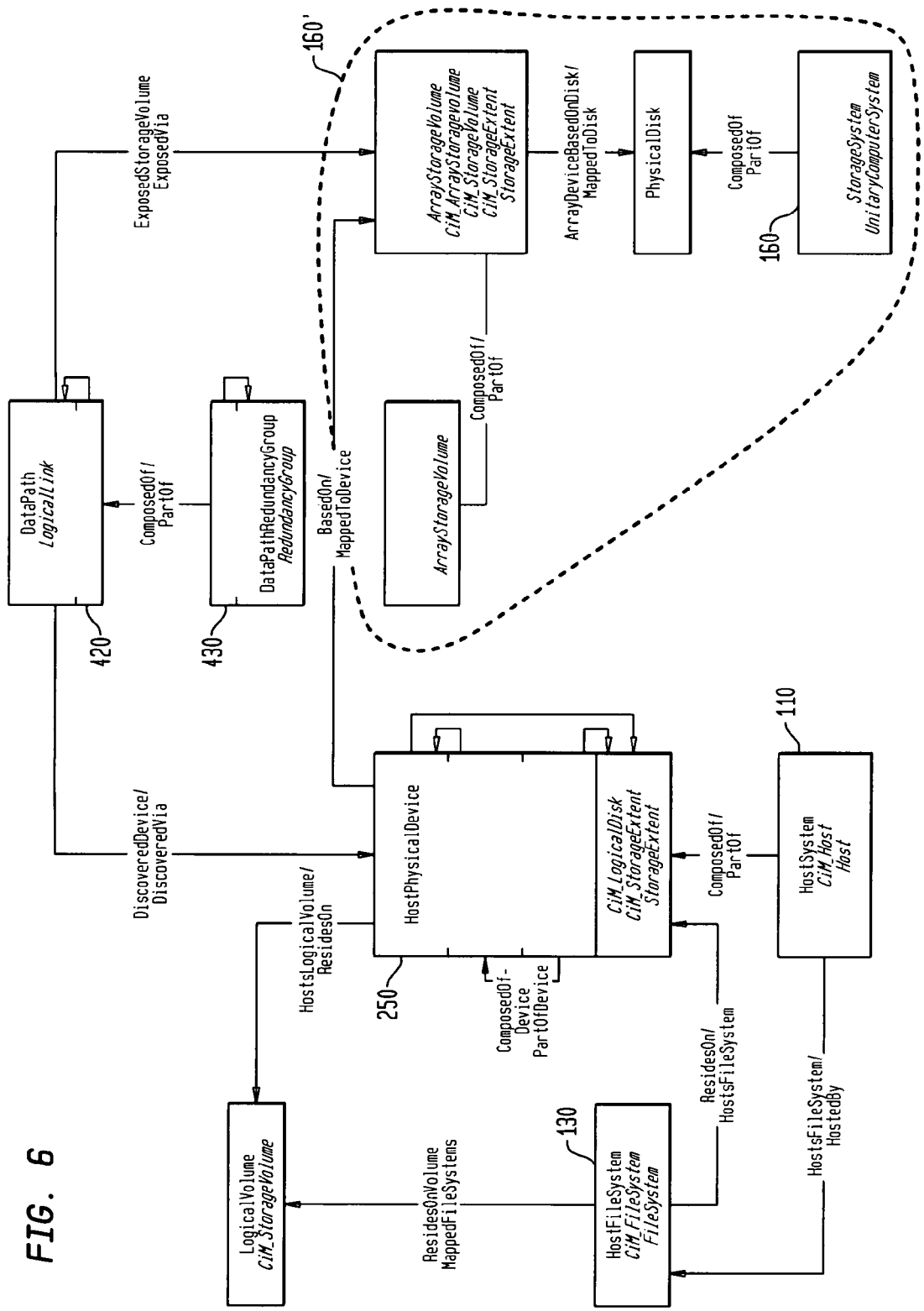
FIG. 6 illustrates a logical representation of the data path connection between the host and the storage system in accordance with the principles of the invention.

FIG. 6 illustrates a logical representation of the data path connection between the host 110 and the storage system 160. More specifically, the host 110. which includes a HostFileSystem 130, is part of a HostPhysicalDevice 250. The HostFileSystem 130 resides on the HostPhysicalDevice 250. The HostPhysicalDevice is connected via DataPath 420, which is part of a DataPath Redundancy Group 430, to the storage system 160. The storage system 160 is composed of StorageSystem 160, which is composed of PhysicalDisks, which are mapped to an ArrayStorageVolume.

FIG. 7 illustrates an exemplary diagnostic analysis in accordance with the principles of the invention for the exemplary SAN shown herein. In this case, the object classes shown representative elements within the network, which when determined to be a predetermined diagnostic state, (e.g., up, available, unavailable, down, at-risk) exhibit particular types of operations of the system. For example, when a storage disk is indicated to be Down, the disk is flagged as not functioning properly and the data stored on the disk is inaccessible. In another aspect when a data path is indicated to be down, the specific path is inaccessible. Similarly, when a number of data paths indicated to be Down exceeds a known limit, then the associated redundancy group is considered "at risk."

Figure 8:
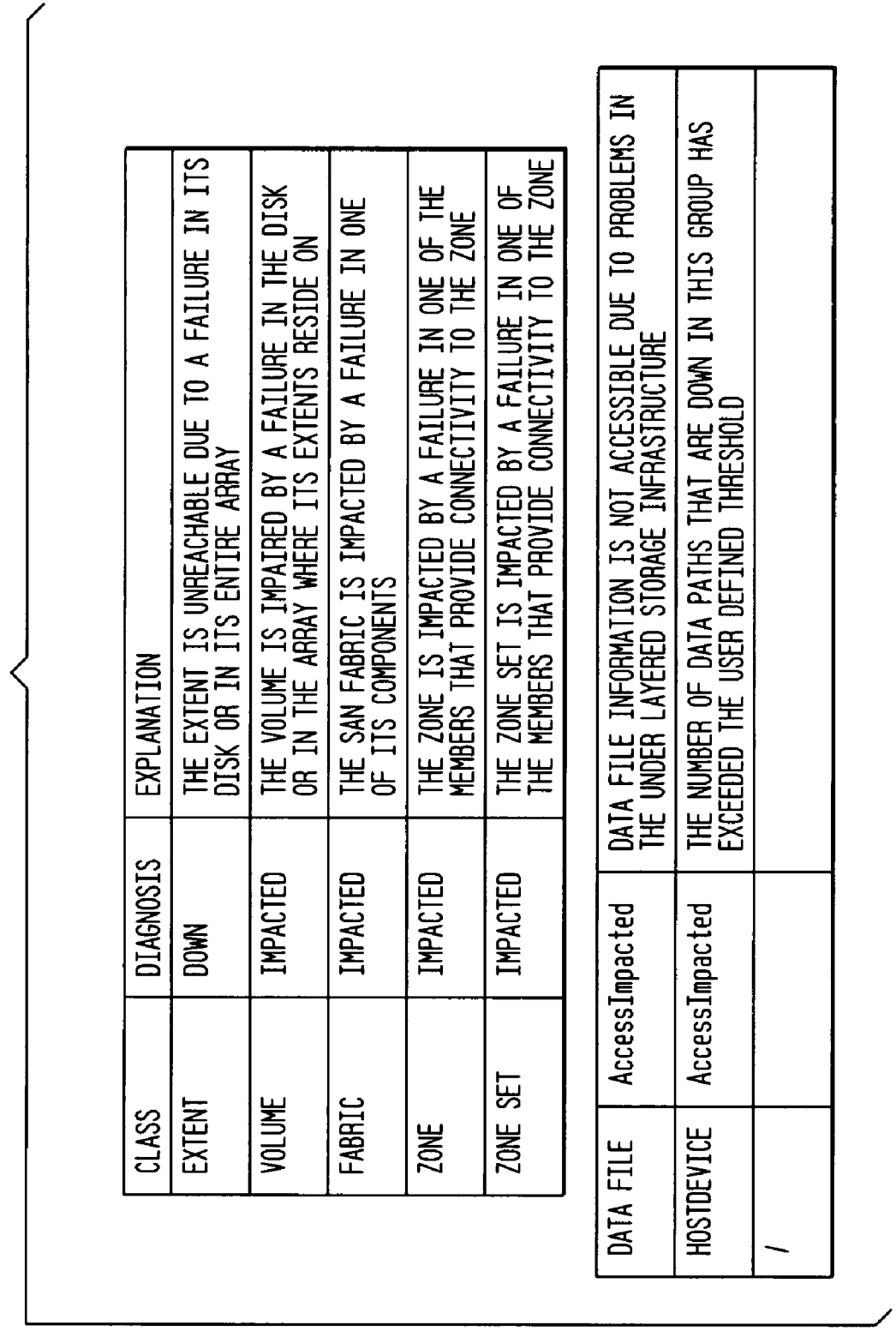
FIG. 8 illustrates an exemplary SAN impact analysis in accordance with the principles of the invention.

FIG. 8 illustrates an exemplary impact analysis in accordance with the principles of the invention for the exemplary SAN shown herein. For example, when it is determined that all Data Paths for a host are "down," the host device and filesystem residing on the host device are no longer accessible.

FIGS. 9A-9I, collectively, illustrate an exemplary embodiment of an abstract model in accordance with the principles of the present invention. The model(s) shown is an extension of known network models, such as the EMC® Common Information Model ECIM or similarly defined or pre-existing CIM-based model and adapted for the SAN. Standards for SANS are in development and may be found at http://www.snia.org/smi/tech_activities/smi_spec_pr/spec/]. EMC is a registered trademark of EMC Corporation, Inc., having a principle place of business in Hopkinton, Ma, USA. This model is an extension of the DMTF/SMI model. Model based system representation is discussed in commonly-owned U.S. patent application Ser. No. 11/034,192, filed Jan. 12, 2005 and U.S. Pat. Nos. 5,528,516, 5,661,668 6,249,755 and 6,868,367, the contents of which are incorporated by reference herein. The aforementioned US Patents further teach performing a system analysis based on a mapping of observable events and detectable events, e.g., symptoms and problems, respectively.

Figure 9A:
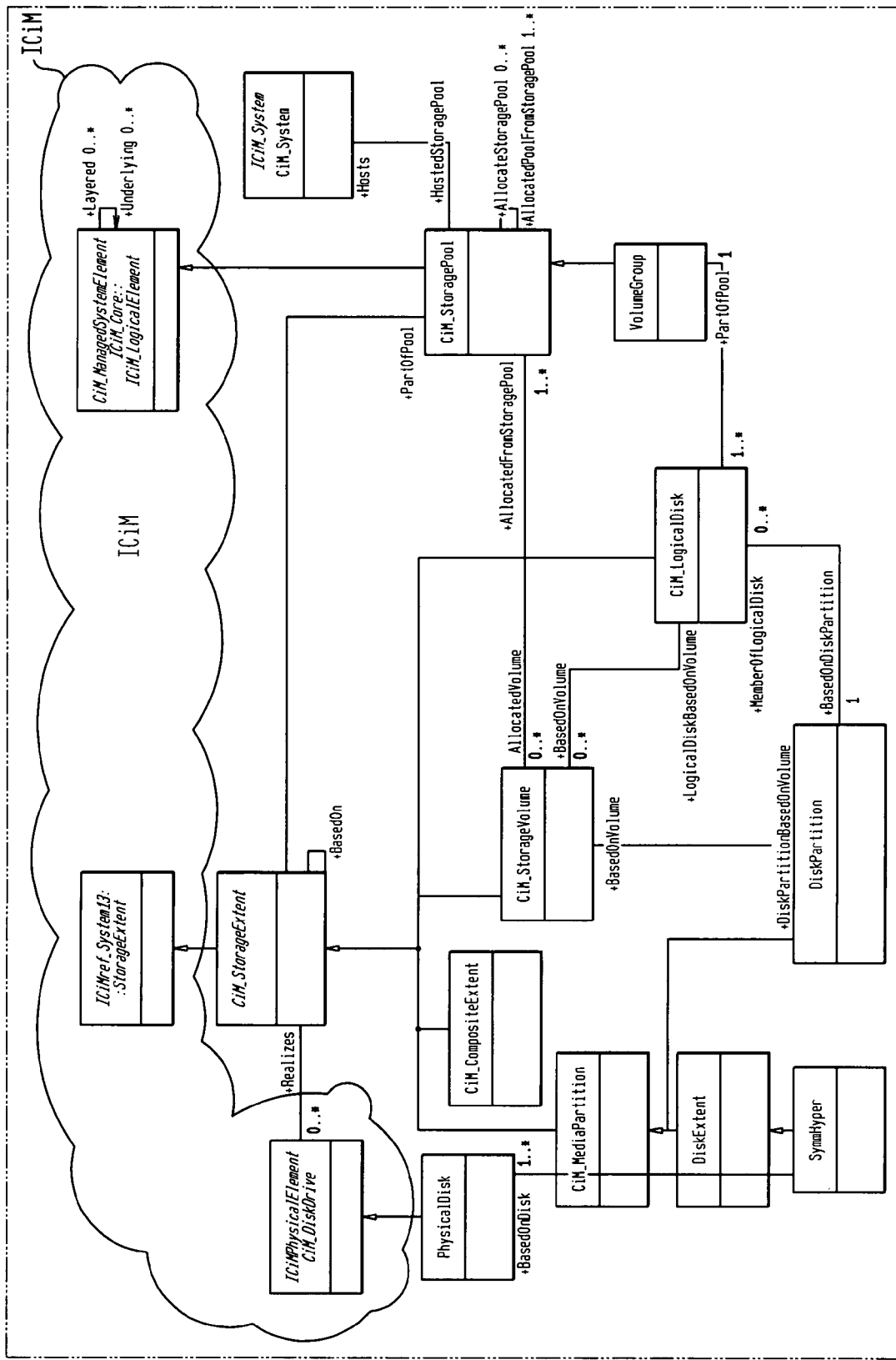
FIGS. 9A-9I illustrate exemplary aspects of a SAN model in accordance with the principles of the invention.
Figure 9B:
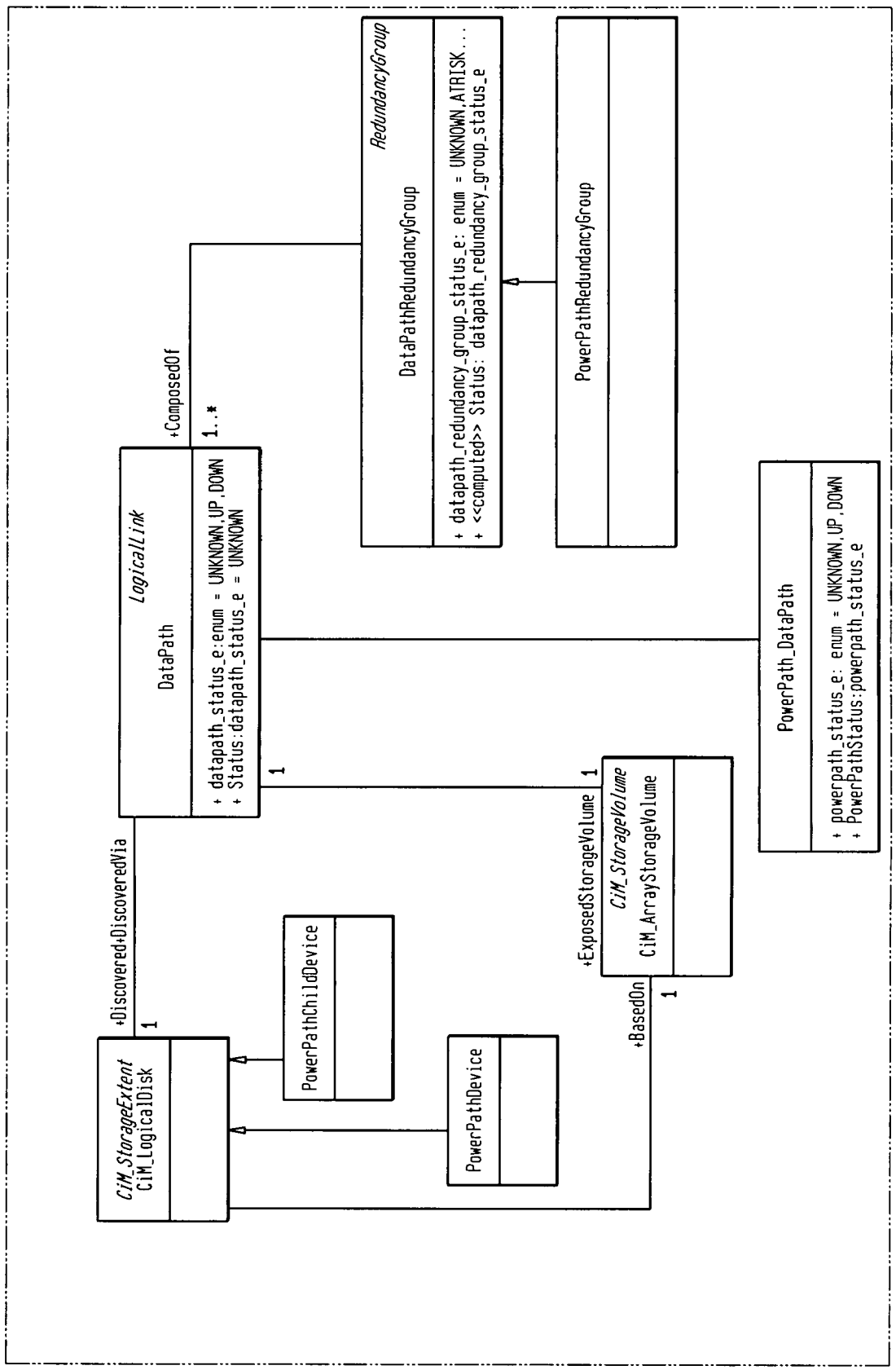
Figures 1, 9C:
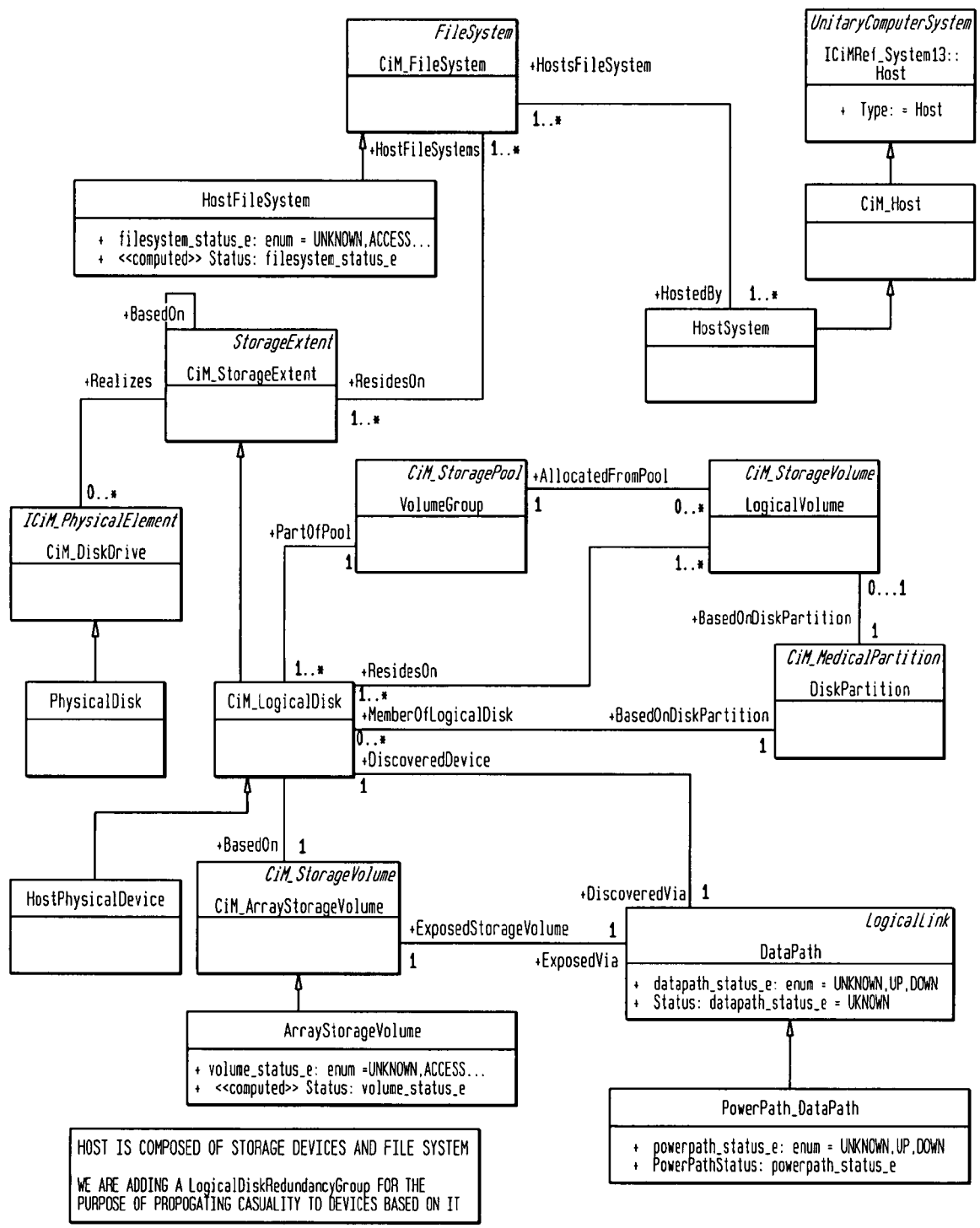
Figures 2, 9C:
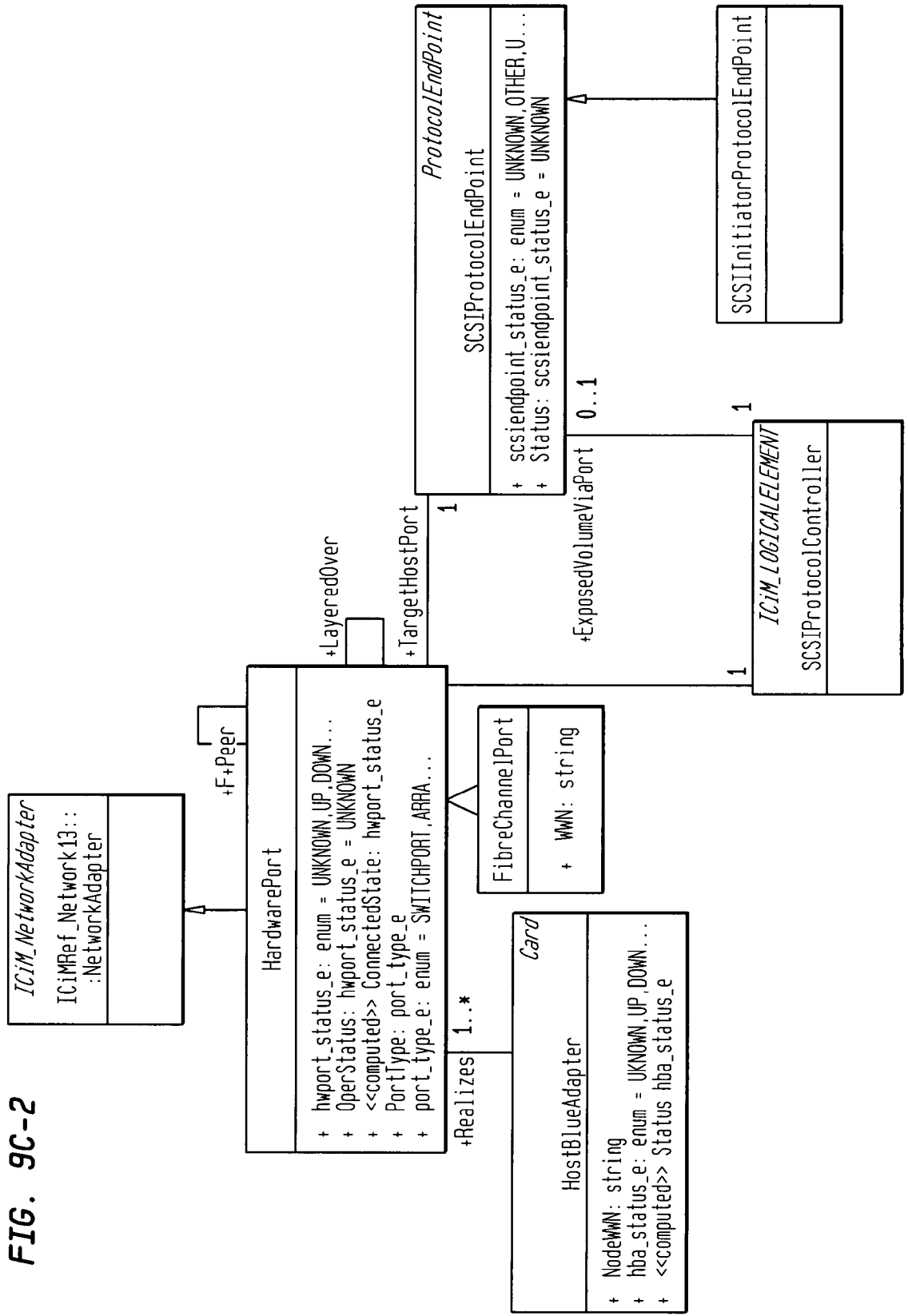
Figures 1, 9D:
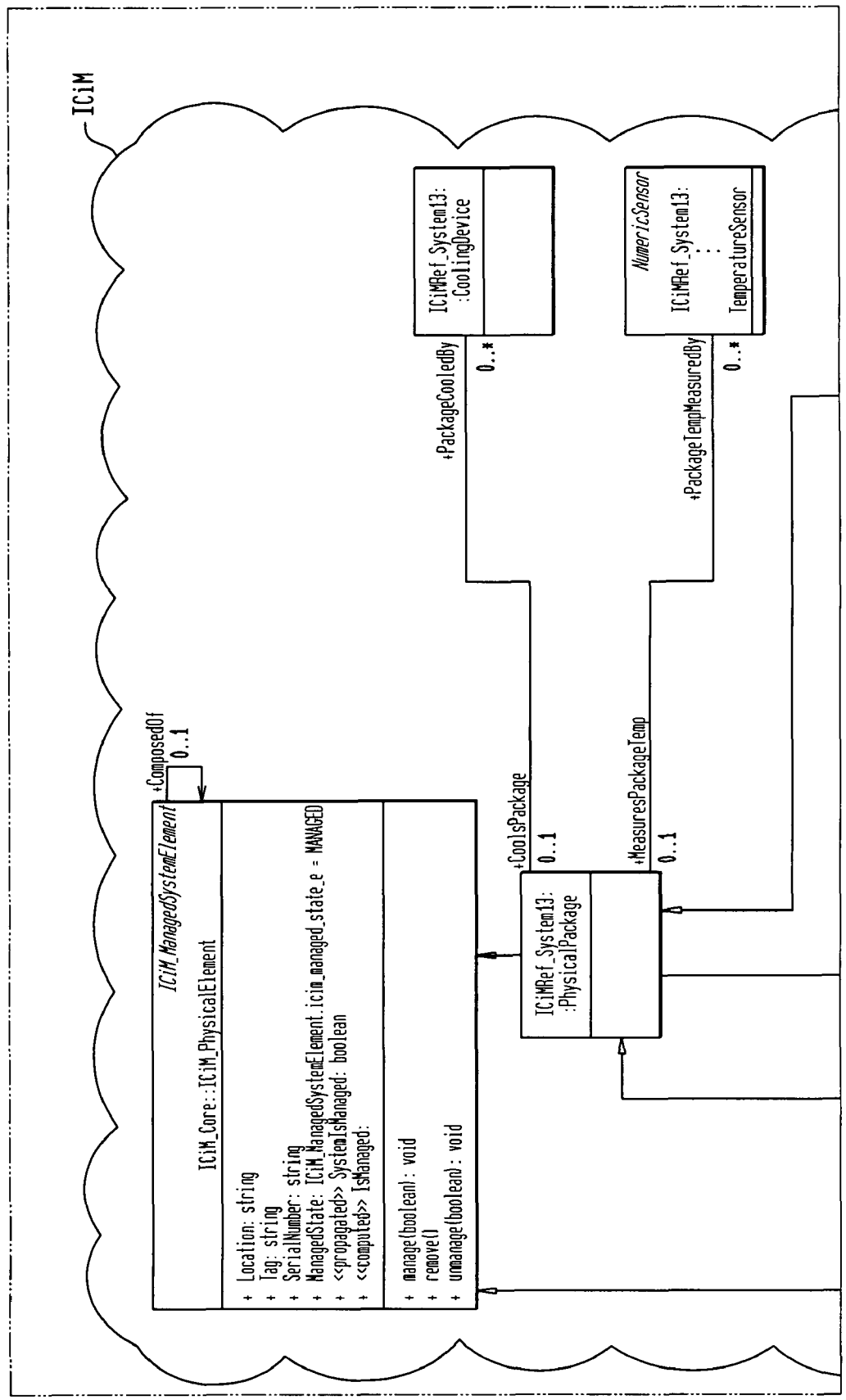
Figures 2, 9D:
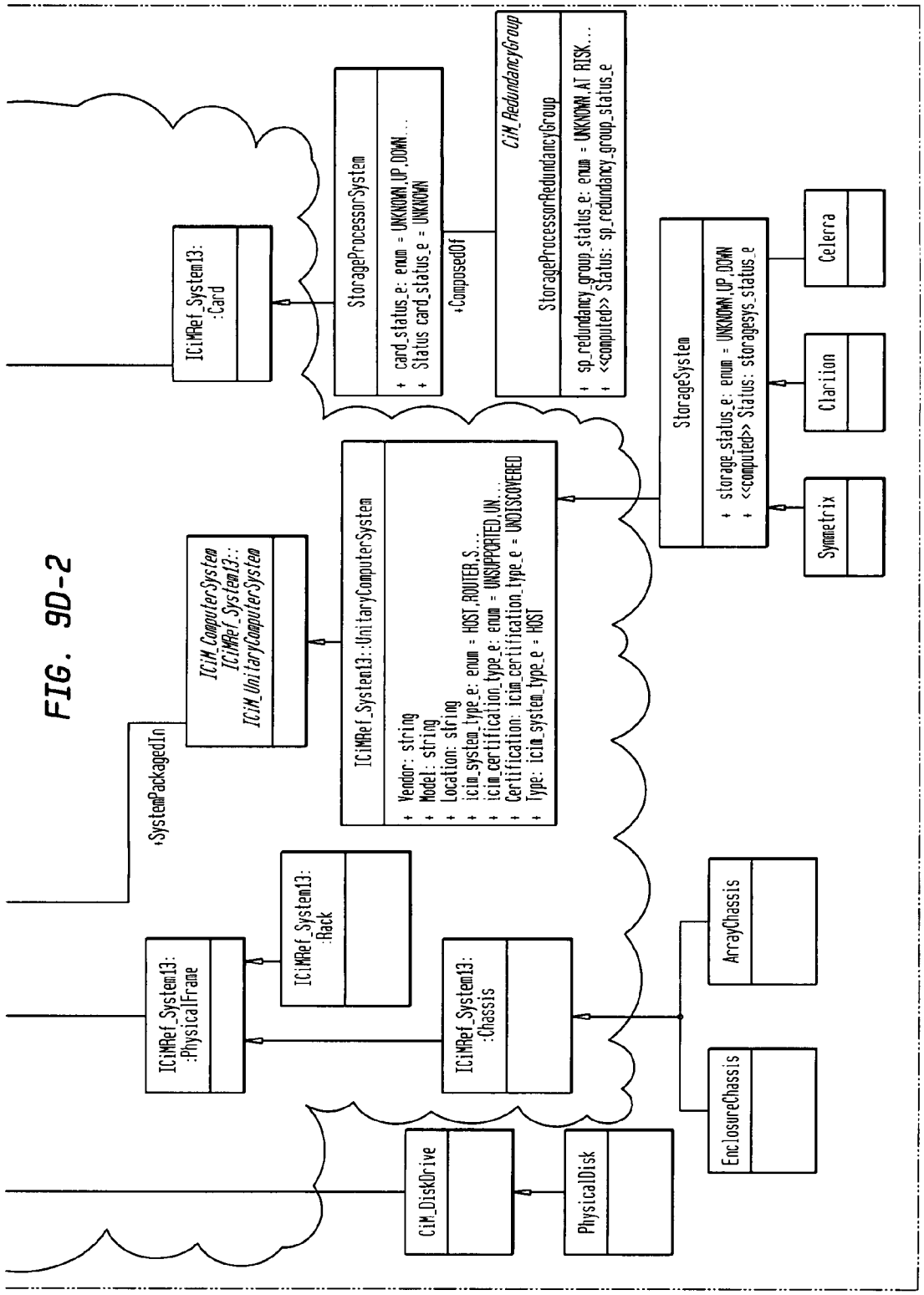
Figure 9E:
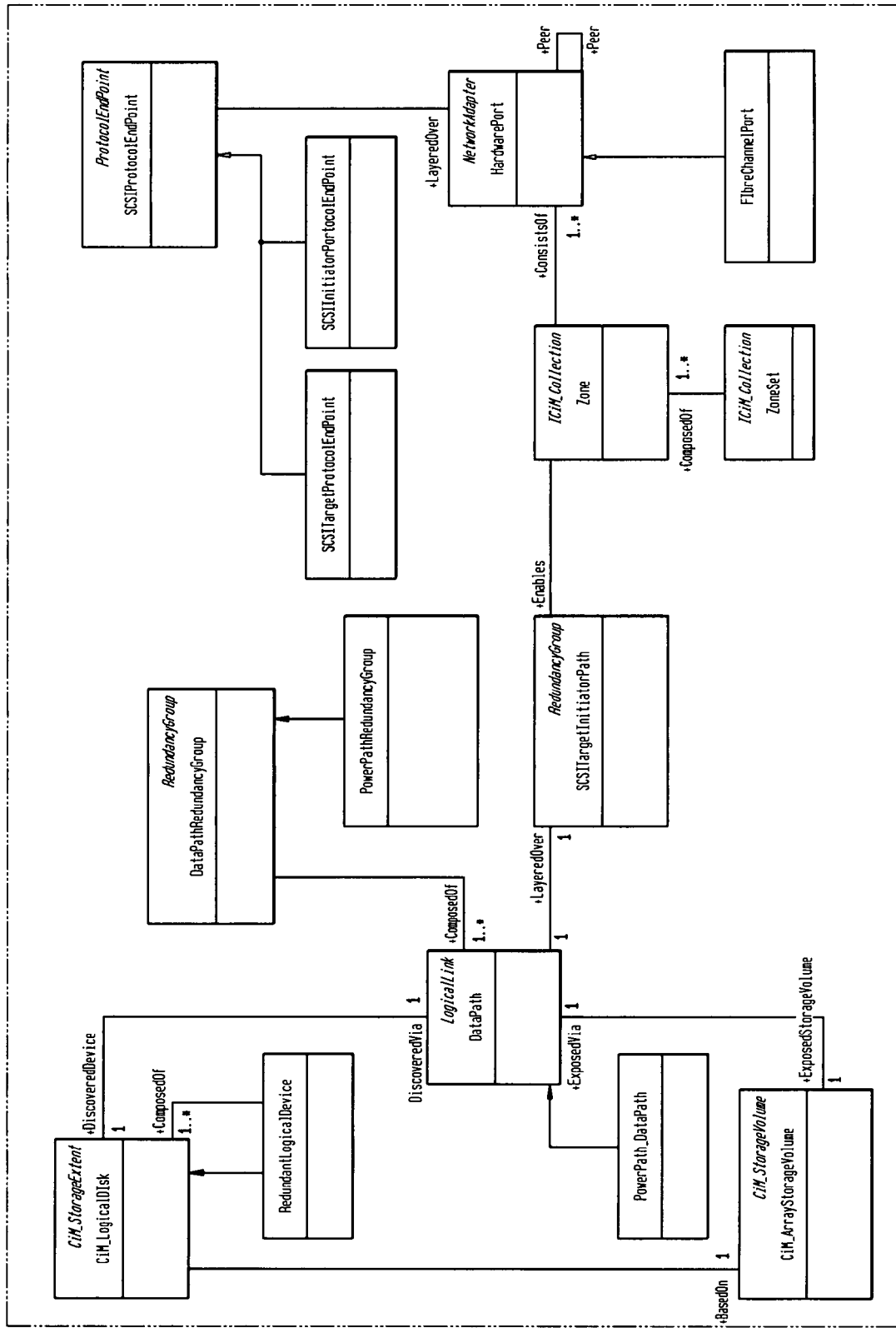
Figure 9F:
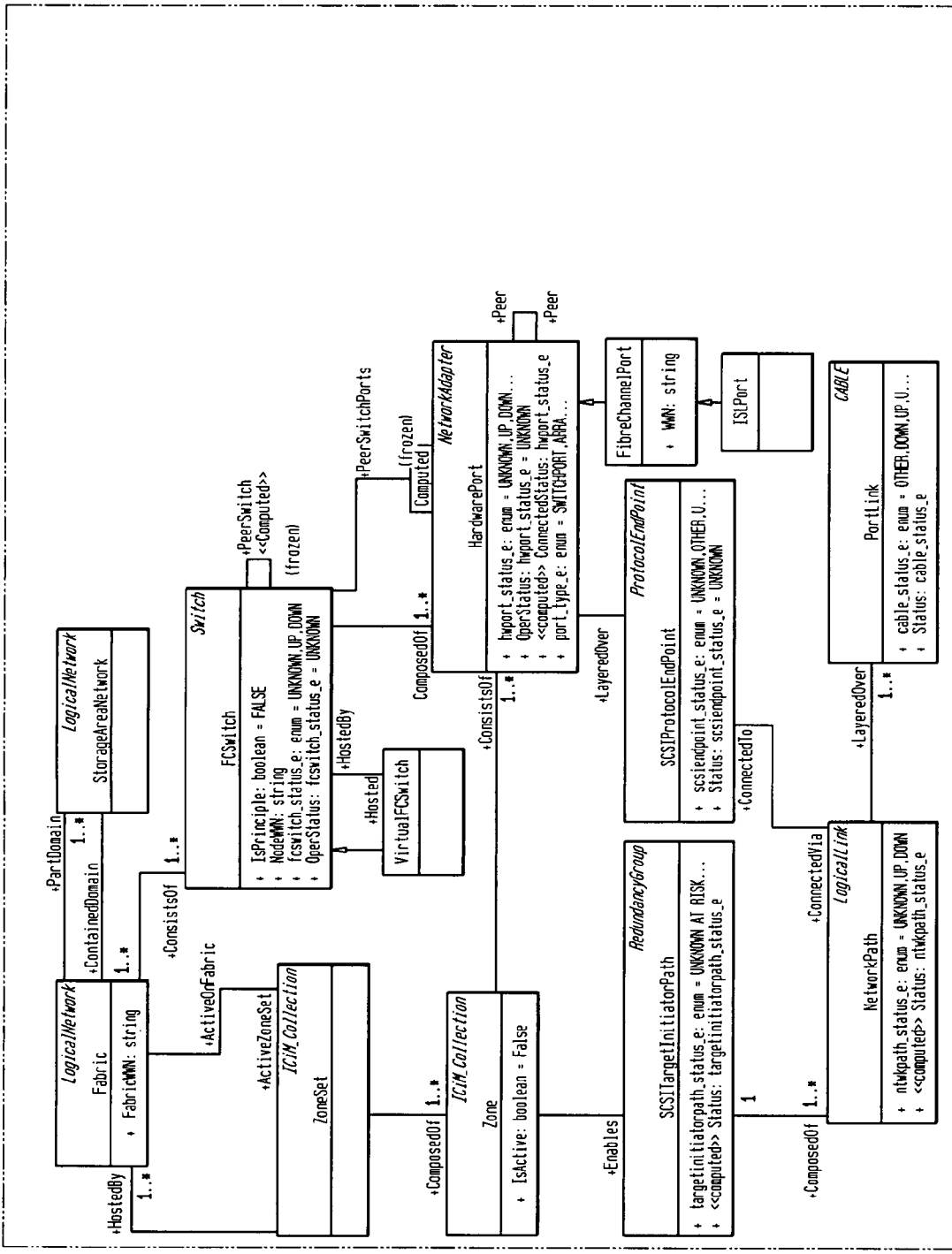
Figure 9G:
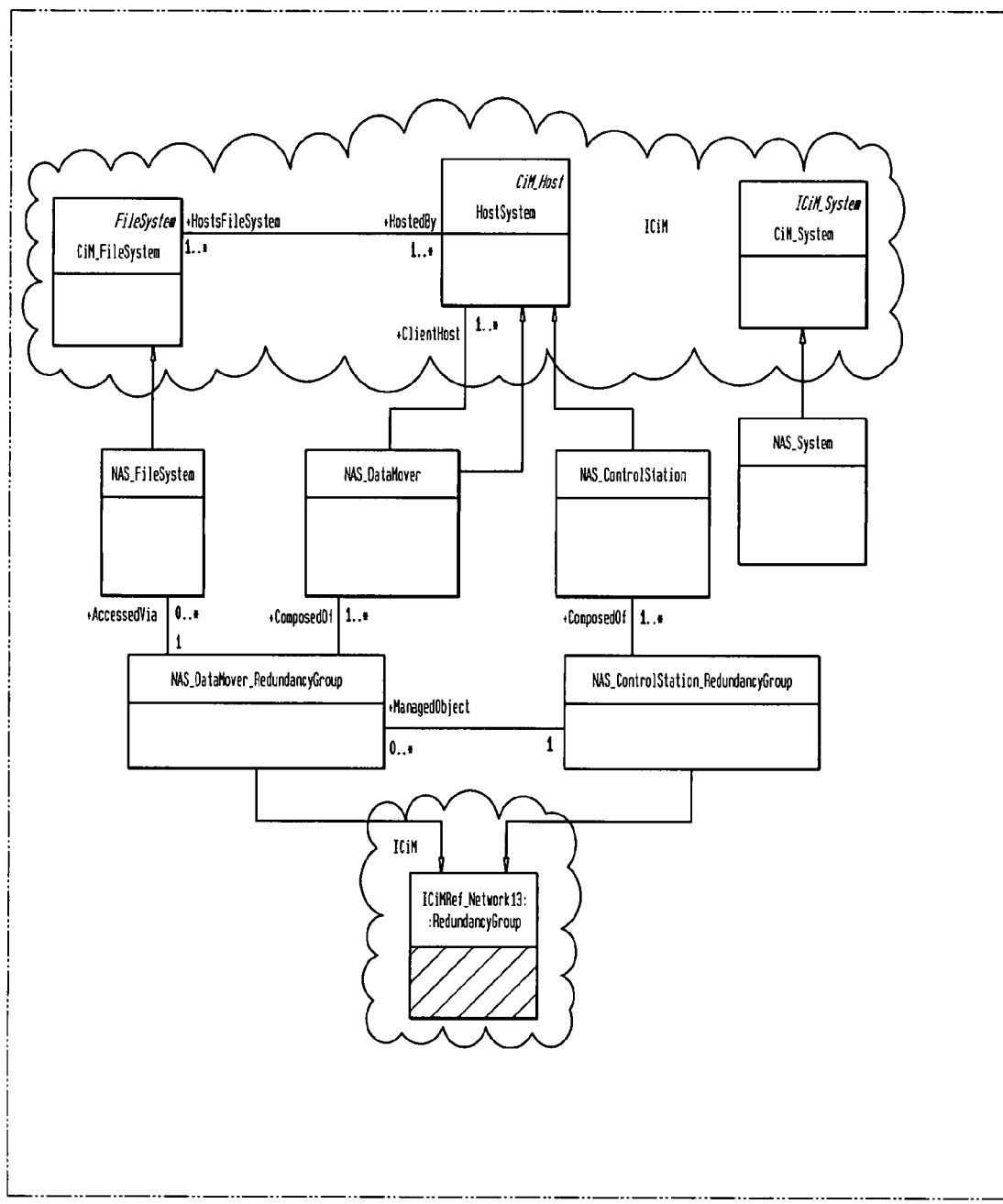
Figures 1, 9H:
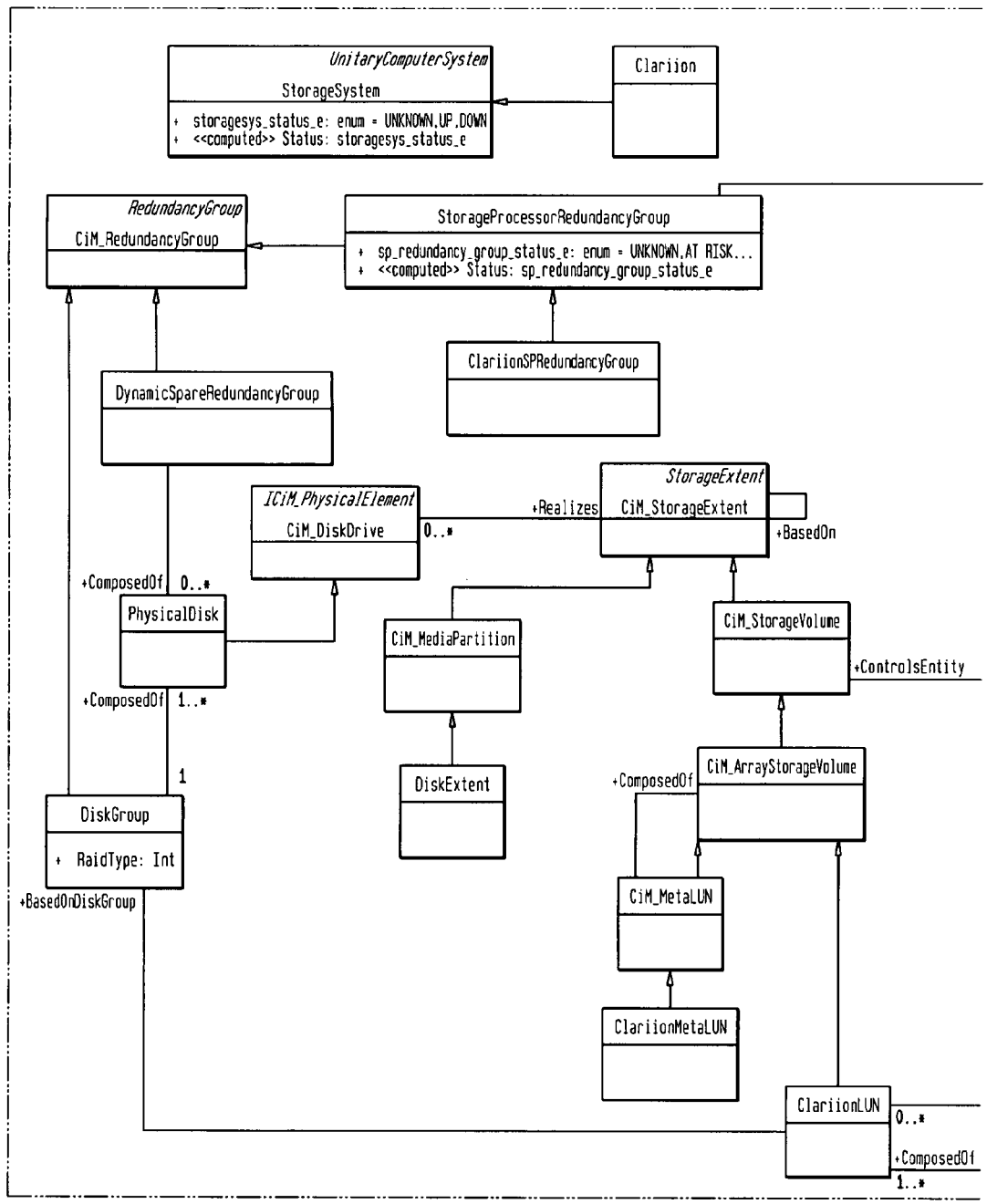
Figures 2, 9H:
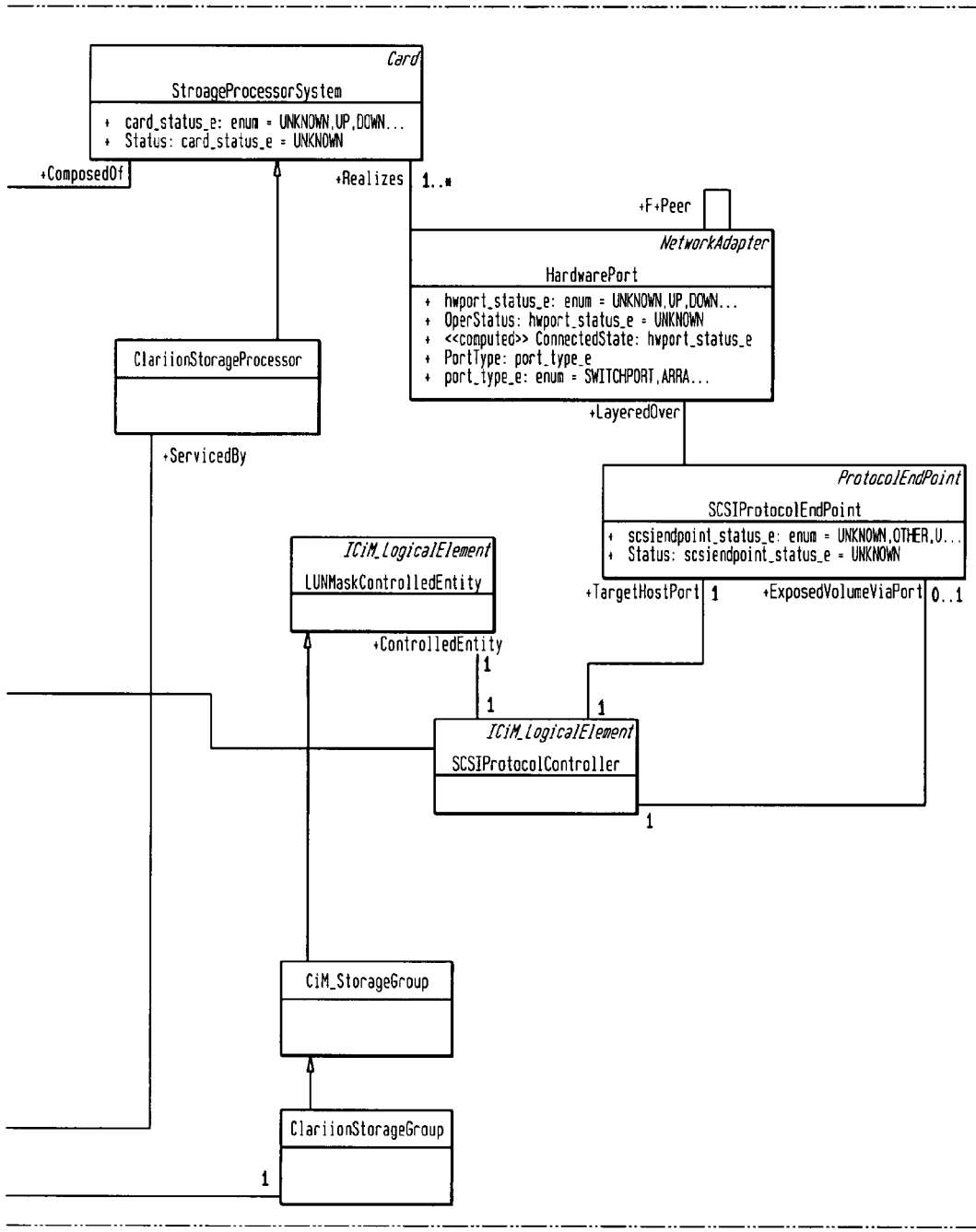
Figures 1, 9I:
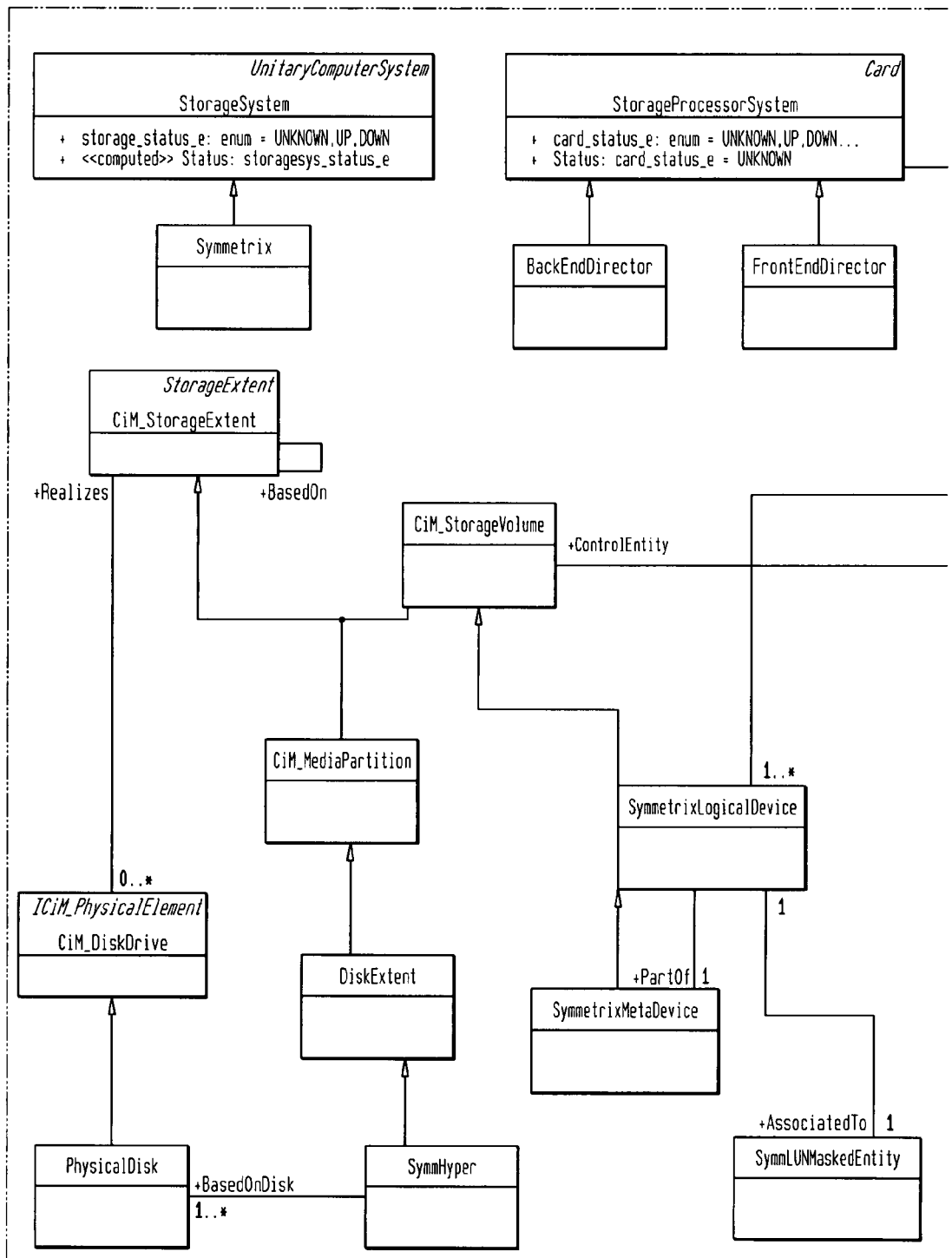
Figures 2, 9I:
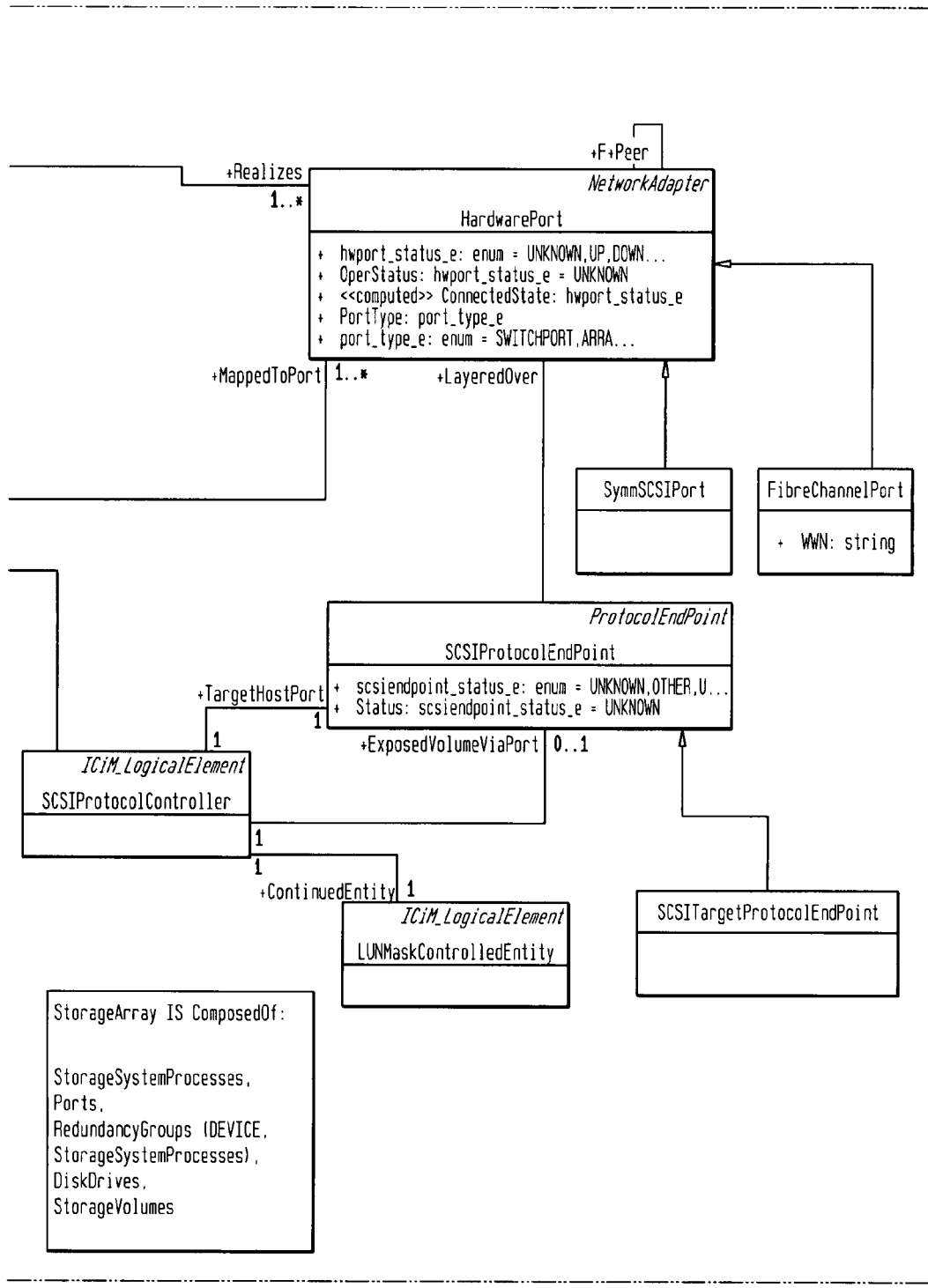

FIG. 9A displays in UML notation, the object types used to model the Storage Disk, the logical constructs built on it and the relations between them. FIG. 9B models a datapath, which relates the host device and the array logical device. The objects in the diagram are extended and implemented for the Powerpath® multipathing software. Powerpath is a registered Trademark of EMC Corporation, Hopkinton, Mass., USA. FIG. 9C models the Host Objects and the storage related objects contained within it, and the relations between them and to the related object types in the storage array. FIG. 9D models the relation between the specific storage devices manufactured and produced by EMC Corporation; Symmetrix, Clariion and Celerra, and related modeled elements, and their derivation from the ICIM model. Symmetrix, Clariion and Celerra are registered Trademarks of EMC Corporation, Hopkinton, Mass., USA. FIG. 9E models the Datapath object, and its relation to other objects in the SAN infrastructure such as HostDevice, Array Logical Device, Hardware Ports, Zone and SCSITargetInitiatorPath. FIG. 9F models the objects in the SAN switched network, such as Fabric, SCSITargetInitiatorPath, Zone, Portlink, Hardware Port, and the relations between them. FIG. 9G models objects within the Celerra and the relations between them. FIG. 9H models the objects within the Clarion, such as Clarion Lun and Disk Group and the relations between them. FIG. 9I models objects within the Symmetrix, such as Symmetrix Hyper, Symmetrix Meta Device, and the relations between them.

Also shown in FIGS. 9A-9I are exemplary attributes and properties of selected ones of the objects. These attributes and properties logically represent the characteristics and operational status of the physically entities that are being represented. Also shown in the inherency of attributes and properties based on the relationship of between selected objects. Object representation and inherency are known is the art, for example Object-Oriented Coded, and need not be discussed in detail herein.

With respect of the model of Storage Area Networks described herein, a root-cause determination or an impact analysis may be determined by a correlation function, similar to that disclosed in the aforementioned commonly-owned US patents and US patent application.

FIG. 10 illustrates exemplary problem\symptom (root-cause) analysis of SAN based on the model described with regard to FIGS. 7 and 9A-9I. As described in the aforementioned US Patents and patent applications, a determination of a measure of the elements of the causality matrix shown may be used to determine the most likely root cause of the one or more of the observed symptoms or events. For example, the detection of an event such as "all peer switch port operationally down" may be caused by one or more problems associated with the storage system. Additional information, which may be incorporated into the causality matrix, may be utilized to determine a specific event causing the observed event "all peer switch port operationally down." However, it can also be determined that a "Clariion Disk Down" indication is not one of the events causing the "all peer switch port operationally down" observed event.

FIG. 11 illustrates an exemplary causality matrix suitable for impact analysis correlation function based on the models shown in FIGS. 8 and 9A-9I. An impact analysis function is utilized for determining the expected events to be observed when one or more failure conditions occur within the network. For example, when a Processor is indicated to be "down" (ProcessorDown), then a plurality of host and hardware related functions are affected.

Although the examples provided herein are with regard to root-cause analysis and impact analysis, it would be recognized that the method described herein may be used to perform a system analysis may include: fault detection, fault monitoring, performance, congestion, connectivity, interface failure, node failure, link failure, routing protocol error, and/or routing control errors.

Figure 12:
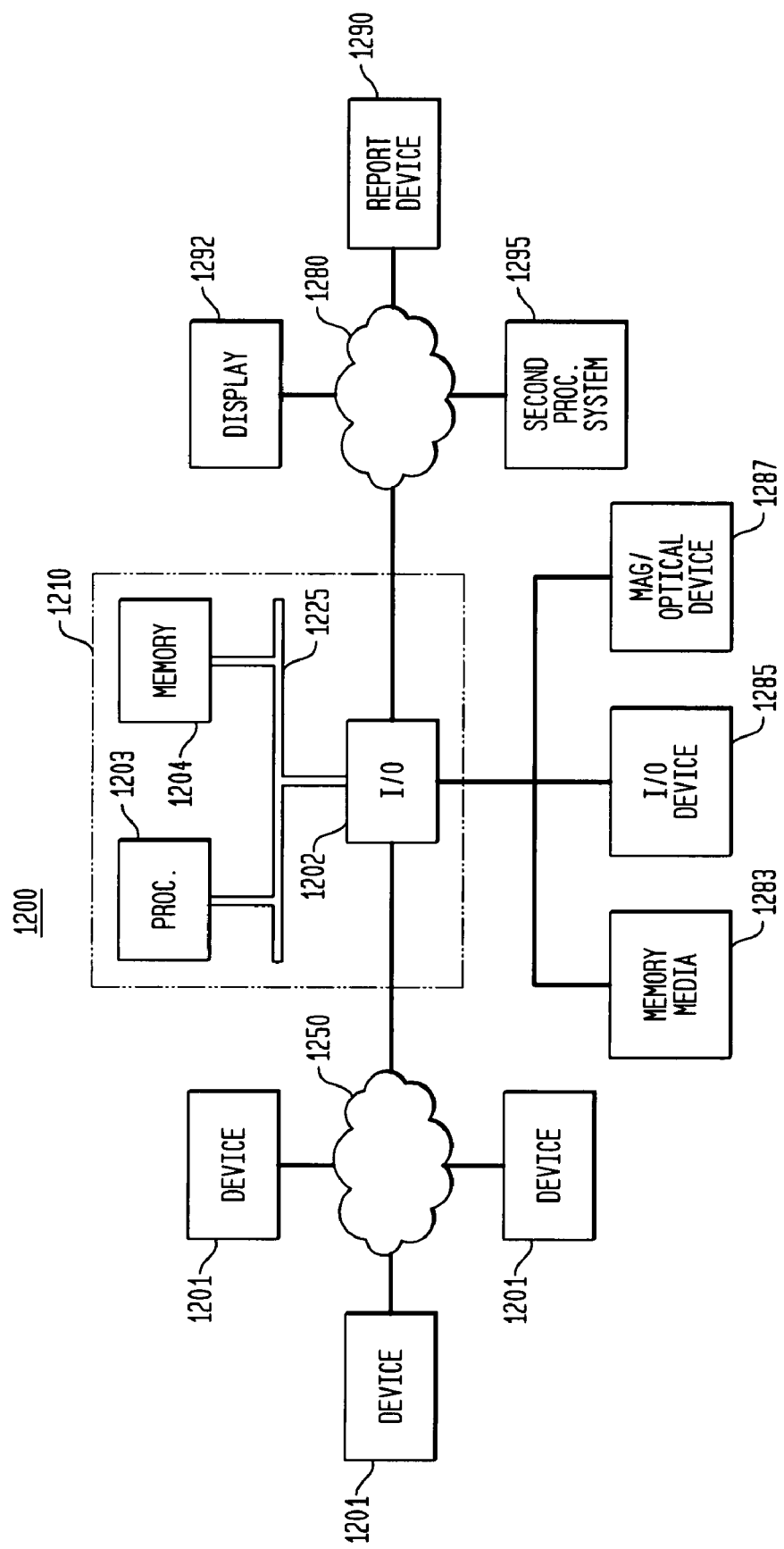
FIG. 12 illustrates a system implementing the processing shown herein.

FIG. 12 illustrates an exemplary embodiment of a system 1200 that may be used for implementing the principles of the present invention. System 1200 may contain one or more input/output devices 1202, processors 1203 and memories 1204. I/O devices 1202 may access or receive information from one or more sources or devices 1201. Sources or devices 1201 may be devices such as routers, servers, computers, notebook computer, PDAs, cells phones or other devices suitable for transmitting and receiving information responsive to the processes shown herein. Devices 1201 may have access over one or more network connections 1250 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 1202, processors 1203 and memories 1204 may communicate over a communication medium 1225. Communication medium 1225 may represent, for example, a bus, a communication network, one or more internal connections of a circuit, circuit card or other apparatus, as well as portions and combinations of these and other communication media. Input data from the client devices 1201 is processed in accordance with one or more programs that may be stored in memories 1204 and executed by processors 1203. Memories 1204 may be any magnetic, optical or semiconductor medium that is loadable and retains information either permanently, e.g. PROM, or non-permanently, e.g., RAM. Processors 1203 may be any means, such as general purpose or special purpose computing system, such as a laptop computer, desktop computer, a server, handheld computer, or may be a hardware configuration, such as dedicated logic circuit, or integrated circuit. Processors 1203 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 1204. The code may be read or downloaded from a memory medium 1283, an I/O device 1285 or magnetic or optical media, such as a floppy disk, a CD-ROM or a DVD, 1287 and then stored in memory 1204. The code may also be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 1201 received by I/O device 1202, after processing in accordance with one or more software programs operable to perform the functions illustrated herein, may also be transmitted over network 1280 to one or more output devices represented as display 1285, reporting device 1290 or second processing system 1295.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform a system analysis may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for performing an analysis on a Storage Area Network (SAN) system, containing a plurality of components, the method comprising the steps of:

representing, in a computer, selected ones of the plurality of components and the relationship among the components, wherein the representation comprises the steps of:

creating at least one non-specific representation, in a computer, of the selected components, wherein the non-specific representations are selected from the group consisting of: DiskPartition, DataPath, PowerPath_DataPath, PowerPathDevice, PowerPathChildDevice, DataPathRedundancyGroup, ScSiProtocolEndPoint, HostBusAdapter, StorageProcessorSystem, StorageProcessorRedundancyGroup, SCSITargetProtocolEndPoint, HardwarePort, NetworkPath, Portlink,NAS-Datamover_RedundancyGroup; NAS_ControlStation_RedundancyGroup, NAS-ControlStation, NAS_DataMover, NAS_FileSystem, NAS_System; and creating at least one non-specific representation, in a computer, of relations along which the events propagate amongst the selected components, wherein the representations of relations are selected from the group consisting of: BasedOnVolume, DiskPartitionBaseOnVolume; BasedOnDiskPartition, Part of/AllocatedVolume, AllocatedFromStoragePool, HostedStoragePool, ComposedOf, ExposedVia, ExposedStorageVolume, Based On, HostedBy, ResidesOnDiskPartition, MemberOf/LogicalDisk, AllocatedFromPool, Peer, LayeredOver, Enables, ConsistsOf, Part OfDomain, AccessedVia, and ControlledEntity;

providing a mapping between a plurality of events and a plurality of observable events occurring among the components, wherein the mapping is represented as a value associating each event with each observable event; and performing the system analysis based on the mapping of events and observable events.

2. The method as recited in claim 1, wherein the step of performing an analysis comprises the step of:

determining a mismatch measure based on the values associated with the plurality of observable events and the plurality of events.

3. The method as recited in claim 1, wherein the analysis comprises the step of:

determining at least one causing event based on the at least one of the plurality of observed events.

4. The method as recited in claim 1, wherein the system analysis is selected from the group consisting of: fault detection, fault monitoring, performance, congestion, connectivity, interface failure, node failure, link failure, routing protocol error, routing control errors, and root-cause analysis.

5. An apparatus for performing an analysis on a Storage Area Network (SAN) system, containing a plurality of components, the apparatus comprising:

a processor in communication with a memory, the processor executing code for:

representing selected ones of the plurality of components and the relationship among the components, wherein the representation comprises the steps of:

creating at least one non-specific representation of the selected components, wherein the non-specific representations are selected from the group consisting of: DiskPartition, DataPath, PowerPath_DataPath, PowerPathDevice, PowerPathChildDevice, DataPathRedundancyGroup, ScSiProtocolEndPoint, HostBusAdapter, StorageProcessorSystem, StorageProcessorRedundancyGroup, SCSITargetProtocolEndPoint, HardwarePort, NetworkPath, Portlink, NAS-Datamover_RedundancyGroup;

NAS_ControlStation_RedundancyGroup, NAS-ControlStation, NAS_DataMover, NAS_FileSystem, NAS_System; and creating at least one non-specific representation of relations along which the events propagate amongst the selected components, wherein the representations of relations are selected from the group consisting of: BasedOnVolume, DiskPartitionBaseOnVolume; BasedOnDiskPartition, Part of/AllocatedVolume, AllocatedFromStoragePool, HostedStoragePool, ComposedOf, ExposedVia, ExposedStorageVolume, BasedOn, HostedBy, ResidesOnDiskPartition, MemberOf/LogicalDisk, AllocatedFromPool, Peer, LayeredOver, Enables, ConsistsOf, Part OfDomain, AccessedVia, and ControlledEntity;

providing a mapping between a plurality of events and a plurality of observable events occurring among the components, wherein the mapping is represented as a value associating each event with each observable event, and performing the system analysis based on the mapping of events and observable events.

6. The apparatus as recited in claim 5, wherein the step of performing an analysis comprises the step of:

determining a mismatch measure based on the values associated with the plurality of observable events and the plurality of events.

7. The apparatus as recited in claim 5, wherein the system analysis is selected from the group consisting of: fault detection, fault monitoring, performance, congestion, connectivity, interface failure, node failure, link failure, routing protocol error, routing control errors, and root-cause analysis.

8. The apparatus as recited in claim 5, wherein the analysis comprises the step of:

determining at least one causing event based on the at least one of the plurality of observed events.

9. The apparatus as recited in claim 5, further comprising: an input/output device, in communication with the processor.

10. The apparatus as recited in claim 5, wherein the code is stored in the memory.

11. A non-transitory computer readable storage medium storing computer readable code for performing an analysis on a Storage Area Network (SAN) system, containing a plurality of components, the product providing instruction to a computer system for executing the steps of:

representing selected ones of the plurality of components and the relationship among the components, wherein the representation comprises the steps of:

creating at least one non-specific representation of the selected components, wherein the non-specific representations are selected from the group consisting of: DiskPartition, DataPath, PowerPath_DataPath, PowerPathDevice, PowerPathChildDevice, DataPathRedundancyGroup, ScSiProtocolEndPoint, HostBusAdapter, StorageProcessorSystem, StorageProcessorRedundancyGroup, SCSITargetProtocolEndPoint, HardwarePort, NetworkPath, Portlink,NAS-Datamover_RedundancyGroup; NAS_ControlStation_RedundancyGroup, NAS-ControlStation, NAS_DataMover, NAS_FileSystem, NAS_System; and creating at least one non-specific representation of relations along which the events propagate amongst the selected components, wherein the representations of relations are selected from the group consisting of: BasedOnVolume, DiskPartitionBaseOnVolume; BasedOnDiskPartition, Part of/AllocatedVolume, AllocatedFromStoragePool, HostedStoragePool, ComposedOf, ExposedVia, ExposedStorageVolume, BasedOn, HostedBy, ResidesOnDiskPartition, MemberOf/LogicalDisk, AllocatedFromPool, Peer, LayeredOver, Enables, ConsistsOf, Part OfDomain, AccessedVia, and ControlledEntity;

providing a mapping between a plurality of events and a plurality of observable events occurring among the components, wherein the mapping is represented as a value associating each event with each observable event, and performing the system analysis based on the mapping of events and observable events.

12. The computer readable code as recited in claim 11, wherein the step of performing an analysis comprises the step of:

determining a mismatch measure based on the values associated with the plurality of observable events and the plurality of events.

13. The computer readable code as recited in claim 11, wherein the system analysis is selected from the group consisting of: fault detection, fault monitoring, performance, congestion, connectivity, interface failure, node failure, link failure, routing protocol error, routing control errors, and root-cause analysis.

14. The computer readable code as recited in claim 11, wherein the analysis comprises the step of:

determining at least one causing event based on the at least one of the plurality of observed events.

* * * * *